(12) United States Patent
Suzu

(10) Patent No.: US 11,137,305 B2
(45) Date of Patent: Oct. 5, 2021

(54) PRESSURE SENSOR DEVICE

(71) Applicant: Soichiro Suzu, Tokyo (JP)

(72) Inventor: Soichiro Suzu, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/967,868

(22) PCT Filed: Feb. 7, 2019

(86) PCT No.: PCT/JP2019/004472
§ 371 (c)(1),
(2) Date: Aug. 6, 2020

(87) PCT Pub. No.: WO2019/159814
PCT Pub. Date: Aug. 22, 2019

(65) Prior Publication Data
US 2021/0048361 A1    Feb. 18, 2021

(30) Foreign Application Priority Data

Feb. 15, 2018    (JP) .............................. JP2018-024647

(51) Int. Cl.
*G01L 9/00*    (2006.01)
*G01L 19/00*    (2006.01)

(52) U.S. Cl.
CPC .......... *G01L 9/0072* (2013.01); *G01L 9/0051* (2013.01); *G01L 19/0007* (2013.01)

(58) Field of Classification Search
None
See application file for complete search history.

(56) References Cited

U.S. PATENT DOCUMENTS 5,174,158 A    12/1992  Kremidas
5,438,876 A    8/1995   Lewis
(Continued)

FOREIGN PATENT DOCUMENTS

JP    S57-045282    3/1982
JP    H07-027644    1/1995
(Continued)

OTHER PUBLICATIONS

International Search Report for PCT/JP2019/004472 dated Apr. 2, 2019.
(Continued)

*Primary Examiner* — Brandi N Hopkins
*Assistant Examiner* — Nigel H Plumb
(74) *Attorney, Agent, or Firm* — IPUSA, PLLC

(57) ABSTRACT

A pressure sensor device of the present invention includes a first board including external connection terminals, a second board stacked on an upper surface of the first board and including a first through hole and a second through hole, a pressure sensor element including a diaphragm structure and mounted on an upper surface of the second board such that the first through hole is closed by the diaphragm structure, and a cover that is mounted on the upper surface of the second board to cover the pressure sensor element and in which a first channel for guiding a first fluid to an upper surface of the diaphragm structure is formed. A second channel is formed between the first board and the second board to lead from the second through hole to the first through hole and guide a second fluid to a lower surface of the diaphragm structure.

11 Claims, 34 Drawing Sheets

(56) References Cited

U.S. PATENT DOCUMENTS

| | | |
|---|---|---|
| 5,756,899 A | 5/1998 | Ugai et al. |
| 8,707,794 B2 | 4/2014 | Usui |
| 8,869,623 B2 | 10/2014 | Yahata |
| 2012/0304452 A1 | 12/2012 | Hooper et al. |

FOREIGN PATENT DOCUMENTS

| | | |
|---|---|---|
| JP | H09-297043 | 11/1997 |
| JP | 2000-019042 | 1/2000 |
| JP | 2005-091166 | 4/2005 |
| JP | 2007-085968 | 4/2007 |
| JP | 2012-052874 | 3/2012 |
| JP | 2012-233872 | 11/2012 |

OTHER PUBLICATIONS

Partial supplementary European search report for European Patent Application No. 19755059.3 dated Mar. 3, 2021.
Extended European Search Report dated Jun. 8, 2021 with respect to the corresponding European Patent Application No. 19755059.3.

(A)

(B)

(C)

(D)

(A)

(B)

(A)

(B)

(A)

(B)

(A)

(B)

(A)

(B)

(A)

(B)

(C)

(D)

(A)

(B)

(A)

(B)

PRESSURE SENSOR DEVICE

TECHNICAL FIELD

The present invention relates to a pressure sensor device including a semiconductor pressure sensor element.

BACKGROUND ART

A pressure sensor device includes a semiconductor pressure sensor element, and has a packaged configuration including a pressure inlet for introducing a fluid as a measurement target and an air inlet for introducing air as a comparison target. The semiconductor pressure sensor element is a chip that has a structure where a piezoelectric element is provided on the surface of a diaphragm deformable by the pressures of the introduced fluid and the introduced air, and detects the pressure of the fluid relative to the atmospheric pressure.

As described above, when the atmospheric pressure is used as the comparison target pressure, the pressure sensor device is configured such that air is introduced into the air inlet; and when a pressure other than the atmospheric pressure is used as the comparison target, the pressure sensor device is configured such a fluid with the comparison target pressure is introduced into the air inlet.

In the pressure sensor device, terminals of the piezoelectric element in the semiconductor pressure sensor element are connected to external connection terminals of the pressure sensor device. The external connection terminals of the pressure sensor device are fixed to terminals provided on a mounting surface of a motherboard by soldering. Thus, when the pressure sensor device is used, the pressure sensor device is mounted on the motherboard.

For example, Patent Documents 1 and 2 disclose pressure sensor devices including a semiconductor pressure sensor element.

RELATED-ART DOCUMENTS

Patent Documents

[Patent Document 1] Japanese Unexamined Patent Application Publication No. 2012-233872
[Patent Document 2] Japanese Unexamined Patent Application Publication No. 2012-052874

DISCLOSURE OF INVENTION

Problems to be Solved by the Invention

The pressure sensor device disclosed in Patent Document 1 is formed by insert molding using a lead frame and is configured such that leads extend outward from the package of the pressure sensor device. Because the leads extend outward, the occupied area of the pressure sensor device mounted on a motherboard becomes large, and it is difficult to reduce the size of the pressure sensor device.

In the pressure sensor device disclosed in Patent Document 2, a semiconductor pressure sensor element is disposed directly below a pressure inlet. For this reason, when dust such as flux enters the pressure inlet, the dust may directly adhere to and greatly affect the semiconductor pressure sensor element and may prevent the semiconductor pressure sensor element from operating correctly.

One object of the present invention is to provide a pressure sensor device that can be miniaturized and is configured to suppress the entry of dust into a pressure inlet.

Means for Solving the Problems

To achieve the above object, a pressure sensor device of the present invention includes a first board including external connection terminals, a second board stacked on an upper surface of the first board and including a first through hole and a second through hole formed therein, a pressure sensor element including a diaphragm structure and mounted on an upper surface of the second board such that the first through hole is closed by the diaphragm structure, and a cover that is mounted on the upper surface of the second board to cover the pressure sensor element and in which a first channel for guiding a first fluid to an upper surface of the diaphragm structure is formed. A second channel is formed between the first board and the second board, and the second channel leads from the second through hole to the first through hole and guides a second fluid to a lower surface of the diaphragm structure.

Advantageous Effect of the Invention

The present invention makes it possible to miniaturize a pressure sensor device and to suppress the entry of dust into a pressure inlet of the pressure sensor device.

DESCRIPTION OF EMBODIMENTS

First Embodiment

Figure 1:
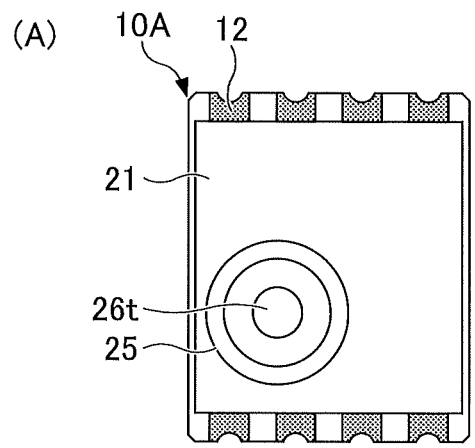
FIG. 1 is a top plan view (A), a side view (B), a side view (C), and a bottom plan view (D) of a pressure sensor device according to a first embodiment.
Figure 1:
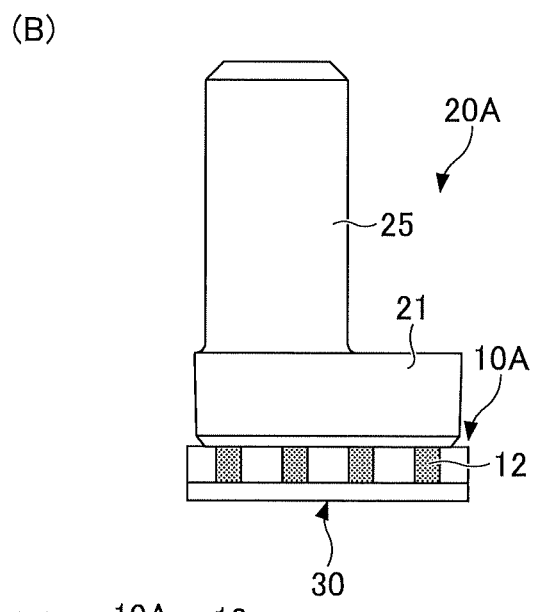
Figure 1:
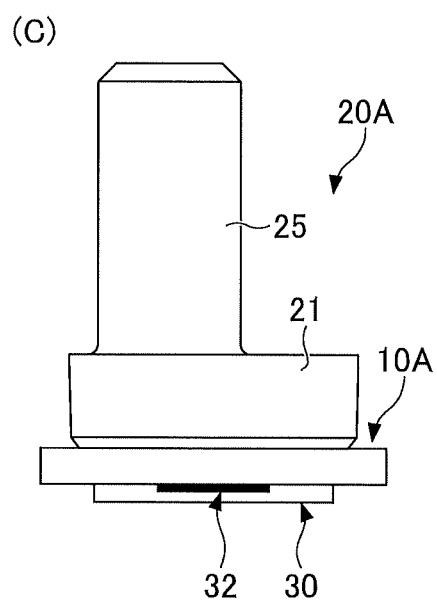
Figure 1:
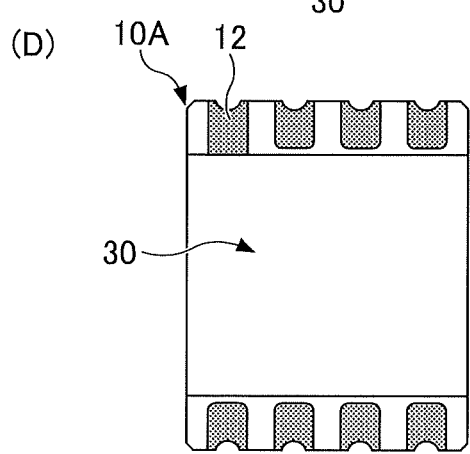

An embodiment of the present invention is described below with reference to the accompanying drawings. FIG. 1(A) is a top plan view, FIG. 1(B) and FIG. 1(C) are side views, and FIG. 1(D) is a bottom plan view of a pressure sensor device according to the present embodiment. A cover 20A is mounted on the upper surface of a board 10A, and a lid 30 is mounted on the lower surface of the board 10A. The board 10A is shaped like a plate having a rectangular shape in plan view. Multiple terminals 12 are arranged on two opposite sides of the board 10A.

The cover 20A is a resin molded product and includes a box-shaped part 21 and a tubular part 25. The tubular part 25 has a columnar outer shape and is a tubular structure having a tubular-part upper-end opening 26t at an end. The lid 30 is shaped like a plate, and a lid opening 32 is formed in a side wall of the lid 30 as a second pressure inlet.

Figure 2:
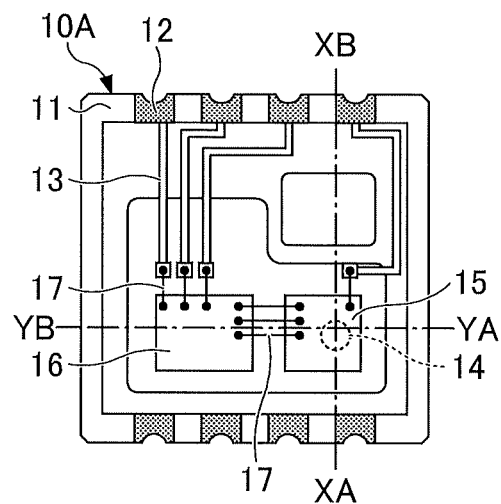
FIG. 2 is a top plan view (A) and a bottom plan view (B) of a board of the pressure sensor device according to the first embodiment.
Figure 2:
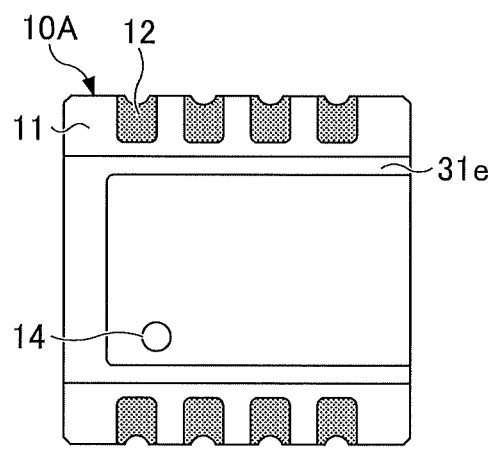

FIG. 2(A) is a top plan view and FIG. 2(B) is a bottom plan view of the board of the pressure sensor device of the present embodiment. The board 10A is formed of, for example, a glass epoxy resin and includes a substrate 11 which serves as a body of a plate-shaped structure and on which the terminals 12 are formed as external connection terminals. The terminals 12 are formed along three surfaces, an upper surface, a side surface, and a lower surface, of the substrate 11. Wires 13 including lands are formed on the upper surface of the substrate 11 and are connected to the terminals 12.

A through hole 14 is formed in the substrate 11. A pressure sensor element 15 is mounted on the upper surface of the substrate 11 so as to close the through hole 14. A control chip 16 is mounted on the upper surface of the substrate 11 at a position adjacent to the pressure sensor element 15. Bonding wires 17 connect the pressure sensor element 15 to the control chip 16, connect the pressure sensor element 15 to the land of the wire 13, and connect the control chip 16 to the lands of the wires 13. A metal layer 31e is formed on the lower surface of the substrate 11 around the through hole 14. The structure around the lid is described later. The board 10A is configured as described above.

The pressure sensor element 15 is an element in which a diaphragm for detecting a pressure is formed. The pressure sensor element 15 is a semiconductor strain gauge element that detects strain of the diaphragm as a change in resistance, a capacitance element that detects displacement of the diaphragm as a change in capacitance, or an element that detects a measurement target pressure using any other detection technique. The pressure sensor element 15 is mounted on the upper surface of the board 10A with an adhesive such as a silicon resin such that the through hole of the board 10A communicates with one side of the diaphragm and the through hole 14 is closed.

Figure 3:
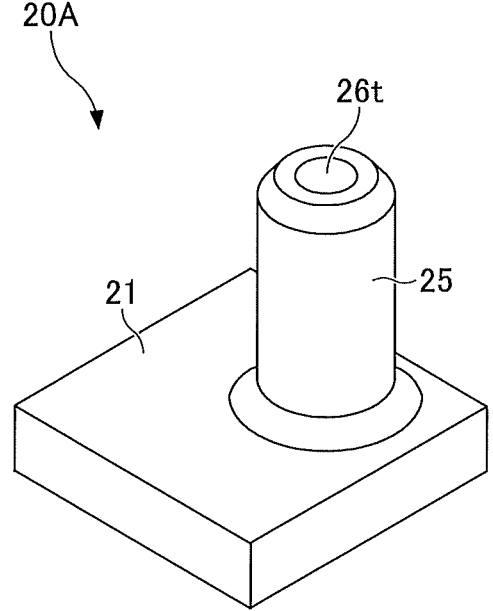
FIG. 3 is a top perspective view (A) and a bottom perspective view (B) of a cover of the pressure sensor device according to the first embodiment.
Figure 3:
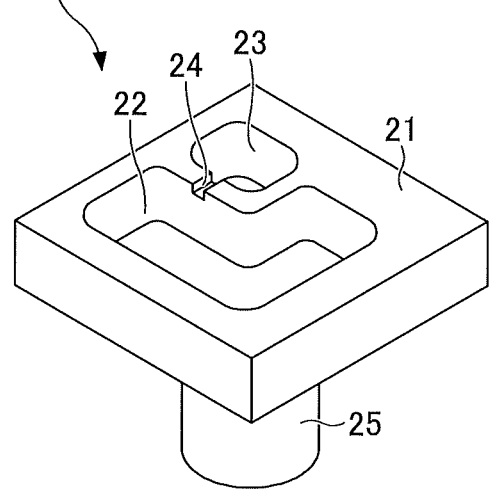

FIG. 3(A) is a top perspective view and FIG. 3(B) is a bottom perspective view of a cover of the pressure sensor device according to the present embodiment. The cover 20A includes the box-shaped part 21 and the tubular part 25. In the surface of the box-shaped part 21 to be bonded to the board 10A, a first recess 22, a second recess 23, and a communicating part 24 through which the first recess 22 communicates with the second recess 23 are formed. When the cover 20A is mounted on the board 10A, a hollow structure (first hollow part) is formed by the surface of the board 10A and the inner surfaces of the first recess 22, the second recess 23, and the communicating part 24 of the cover 20A. The pressure sensor element 15 and the control chip 16 on the board 10A are housed in a space of the first hollow part corresponding to the first recess 22. The tubular part 25 is provided on a portion of the box-shaped part 21 above the second recess 23. An opening structure starting from the tubular-part upper-end opening 26t of the tubular part 25 passes through the tubular part 25 and the box-shaped part 21 and reaches the second recess 23.

Figure 4:
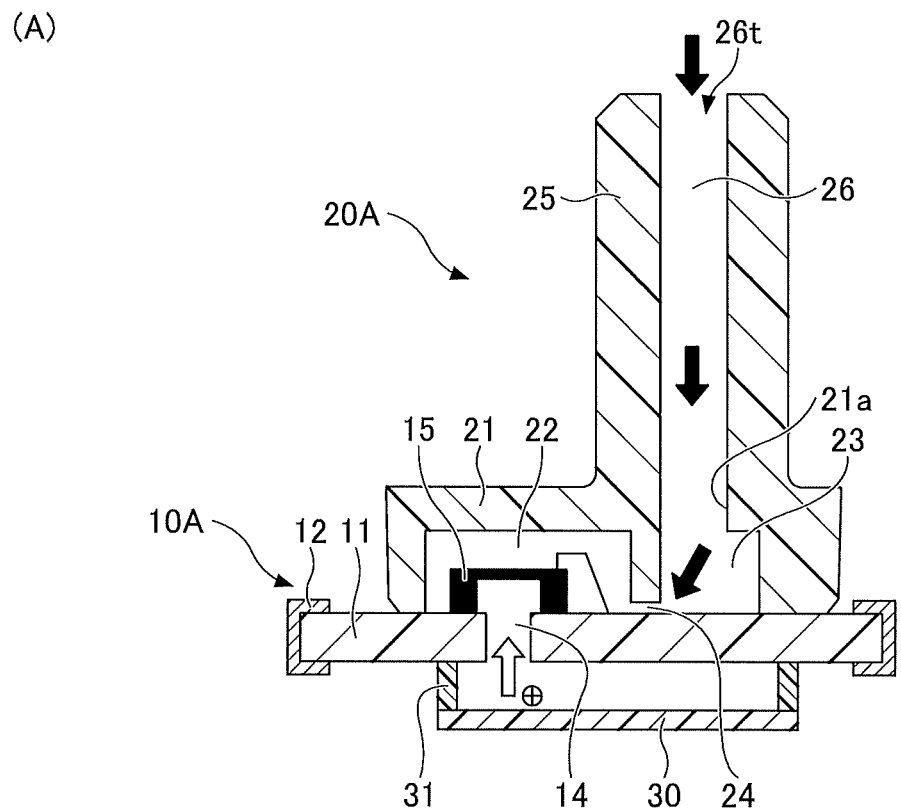
FIG. 4 is cross-sectional views of the pressure sensor device according to the first embodiment.
Figure 4:
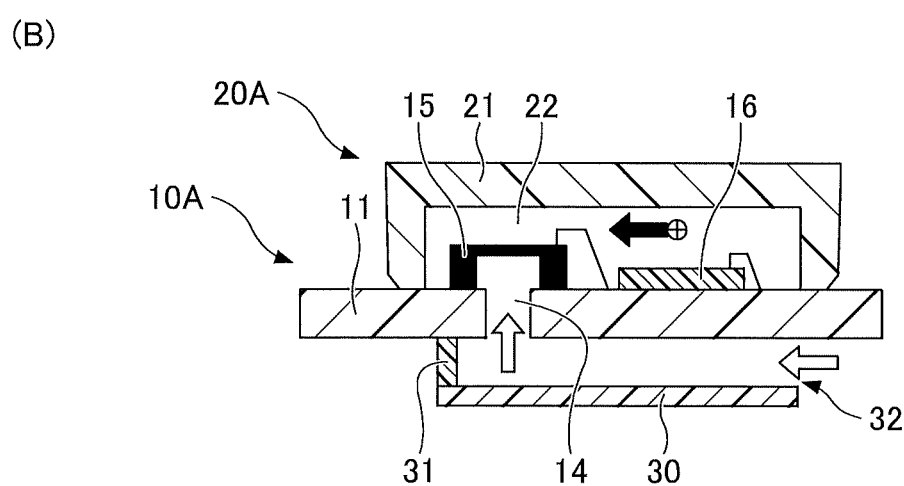

FIG. 4 illustrate cross-sectional views of the pressure sensor device of the present embodiment. FIG. 4 (A) corresponds to a cross section taken along line XA-XB in FIG. 2(A), and FIG. 4(B) corresponds to a cross section taken along line YA-YB in FIG. 2(A). As described above, the opening structure starting from the tubular-part upper-end opening 26t of the tubular part 25 reaches the second recess 23 through a tubular-part opening 26 inside of the tubular part 25 and a box-shaped-part through hole 21a. The second recess 23 communicates with the first recess 22 via the communicating part 24.

Thus, a first channel for guiding a first fluid to the upper surface of the diaphragm structure of the pressure sensor element 15 extends from the tubular-part upper-end opening 26t of the tubular part 25, passes through the tubular-part opening 26, the box-shaped-part through hole 21a, the second recess 23, and the communicating part 24, and reaches the first recess 22. This fluid flow is indicated by black arrows. The first fluid is, for example, a pressure measurement target fluid. In the figures, an arrow with a "+" symbol indicates a flow from a direction perpendicular to the page surface.

A plate-shaped lid 30 is disposed at a predetermined distance from the lower surface of the board 10A to cover the through hole 14. The lid 30 is separated from the board 10A by a side wall 31. A hollow structure (second hollow part) is formed by the lower surface of the board 10A and the inner surfaces of the lid 30 and the side wall 31. A part of the side wall is removed to form a lid opening 32. The opening structure starting from the lid opening 32 communicates with the through hole 14 via the second hollow part and forms a second channel that guides a second fluid to the lower surface of the diaphragm structure of the pressure sensor element 15. This fluid flow is indicated by white arrows. The second fluid is, for example, a pressure measurement comparison target fluid such as air. In the figures, an arrow with a "+" symbol indicates a flow from a direction perpendicular to the page surface.

In the pressure sensor device of the present embodiment, the board 10A has a rectangular shape in plan view. The terminals 12 are formed along two opposite sides of the rectangular board 10A, and the lid opening 32 is open toward a side different from the two opposite sides. Compared with a configuration where the lid opening 32 is open toward the terminals 12, the above configuration can suppress the flux of solder, which is generated near the terminals 12 that are fixed with solder when the pressure sensor device is mounted on the motherboard as described below, from entering the lid opening 32.

As described above, the first fluid is guided to the upper surface of the pressure sensor element 15 and the second fluid is guided to the lower surface of the pressure sensor element 15. The strain or displacement of the diaphragm changes depending on the pressure of the first fluid and the pressure of the second fluid. By detecting the strain or displacement of the diaphragm as the amount of change in resistance or capacitance, it is possible to measure the pressure of the first fluid, which is a measurement target when the second fluid is a comparison target.

In the above configuration, for example, the thickness of the board 10A is about 0.1 mm to 1 mm, and the board 10A is shaped like a rectangle each side of which has a length of about 2 mm to 20 mm in plan view. The box-shaped part 21 of the cover 20A has a height of about 1 mm and has such a size that the box-shaped part 21 does not cover the terminals when the cover 20A is mounted on the board 10A. The tubular part 25 has a diameter of about 0.5 mm, which corresponds to a fraction to one half of each side of the rectangular shape of the board 10A in plan view. The lid 30 is shaped like a plate with a thickness of about 0.1 mm to 1 mm.

Figure 5:
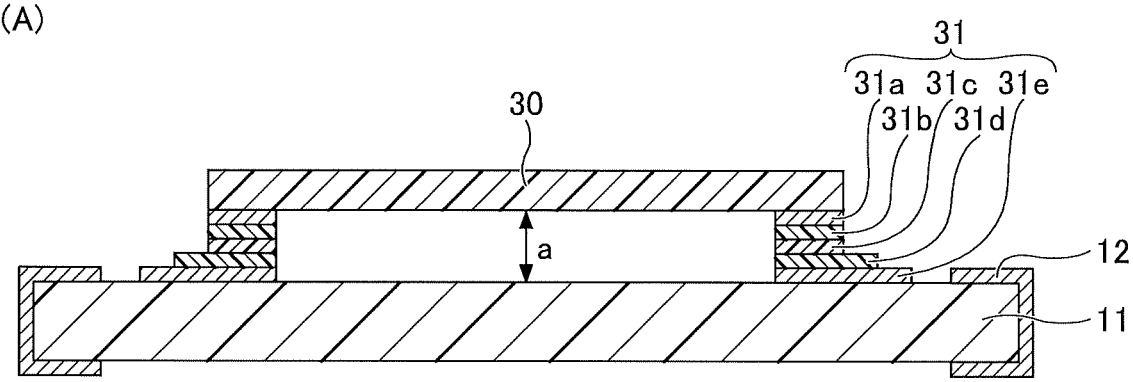
FIG. 5 is a cross-sectional view (A) of a lid of the pressure sensor device according to the first embodiment and a drawing (B) illustrating a configuration of the lid.
Figure 5:
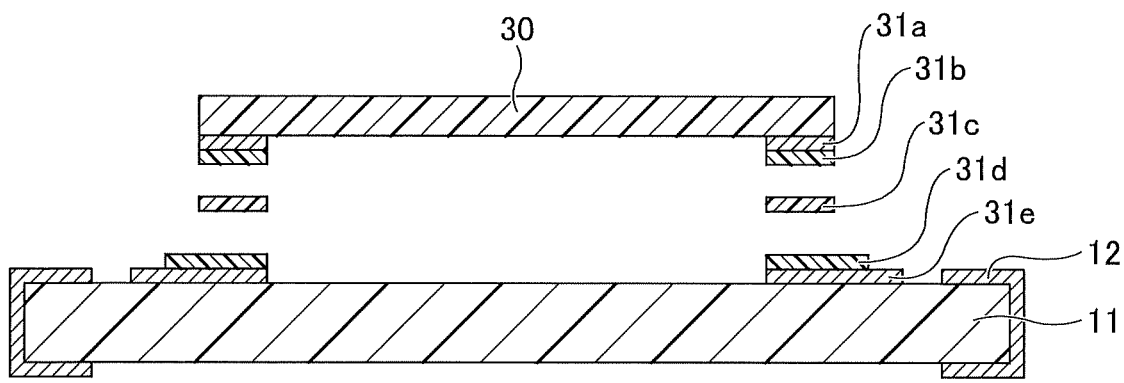

FIG. 5(A) is a cross-sectional view of the lid of the pressure sensor device according to the present embodiment. A side wall 31 is formed to separate the lid 30 from the substrate 11 of the board 10A by a predetermined distance. The side wall 31 is formed by stacking a metal layer 31e of, for example, Cu, Ni, or Au; a resist layer 31d; a bonding sheet 31c, a resist layer 31b, and a metal layer 31a of, for example, copper. Each layer has a thickness of 0.1 µm to 200 µm, and the side wall 31 has a total thickness of about 10 µm to 500 µm. A distance "a" between the board 10A (substrate 11) and the lid 30 corresponds to this thickness.

FIG. 5(B) is a drawing illustrating a configuration of the lid. A method of forming the lid is described with reference to FIG. 5(B). The metal layer 31e is formed by patterning on the lower surface of the board 10A (substrate 11), and the resist layer 31d is formed by patterning on the metal layer 31e. On the other hand, the metal layer 31a and the resist layer 31b are formed by patterning on the surface of the lid 30 to be mounted on the board 10A. Next, the resist layer 31b and the resist layer 31d are bonded to the upper surface and the lower surface of the bonding sheet 31c. As a result, the side wall 31 is formed.

In the present embodiment, the lid opening 32 is formed in the side wall 31 of the lid 30. The lid opening 32 can be formed in the side wall 31 by forming the metal layer 31e, the resist layer 31d, the bonding sheet 31c, the resist layer 31b, and the metal layer 31a except in a region corresponding to the lid opening 32. FIG. 2(B) illustrates a state where the metal layer 31e is formed on the lower surface of the board 10A around the through hole 14. This corresponds to the configuration where the metal layer 31e is formed around the through hole 14 except in a portion that becomes the lid opening 32.

Figure 6:
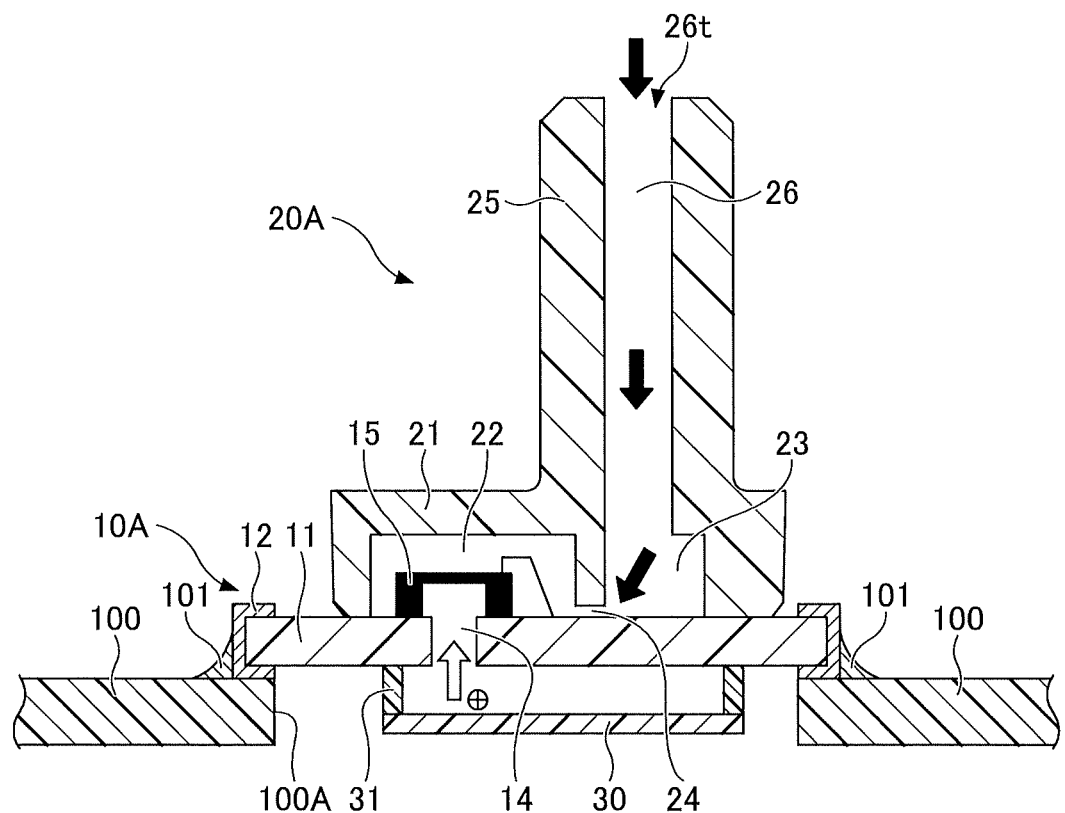
FIG. 6 is cross-sectional views of an example of the pressure sensor device of the first embodiment mounted on a motherboard.
Figure 6:
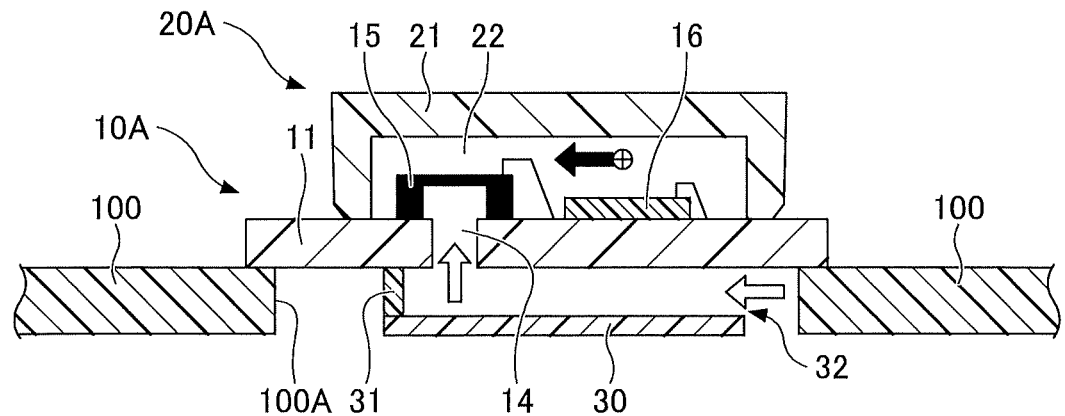

FIG. 6(A) and FIG. 6(B) are cross-sectional views of an example where the pressure sensor device of the present embodiment is mounted on a motherboard, and correspond to the cross sections illustrated in FIG. 4 (A) and FIG. 4(B). In FIG. 6(A) and FIG. 6(B), the pressure sensor device is mounted on a motherboard 100 such that the tubular part 25 faces upward with respect to the motherboard 100. The motherboard 100 is a glass epoxy resin board such as FR-4. Terminals and wiring patterns (not shown) are formed on the surface of the motherboard 100.

An opening 100A is formed in the motherboard 100. The pressure sensor device is mounted on the motherboard 100 such that the lid 30 of the pressure sensor device of the present embodiment is placed in the opening 100A, and the terminals 12 of the pressure sensor device are connected and fixed to the terminals (not shown) of the motherboard 100 by soldering. In this case, the lower and side surfaces of the terminals 12 are connected with solder.

Figure 7:
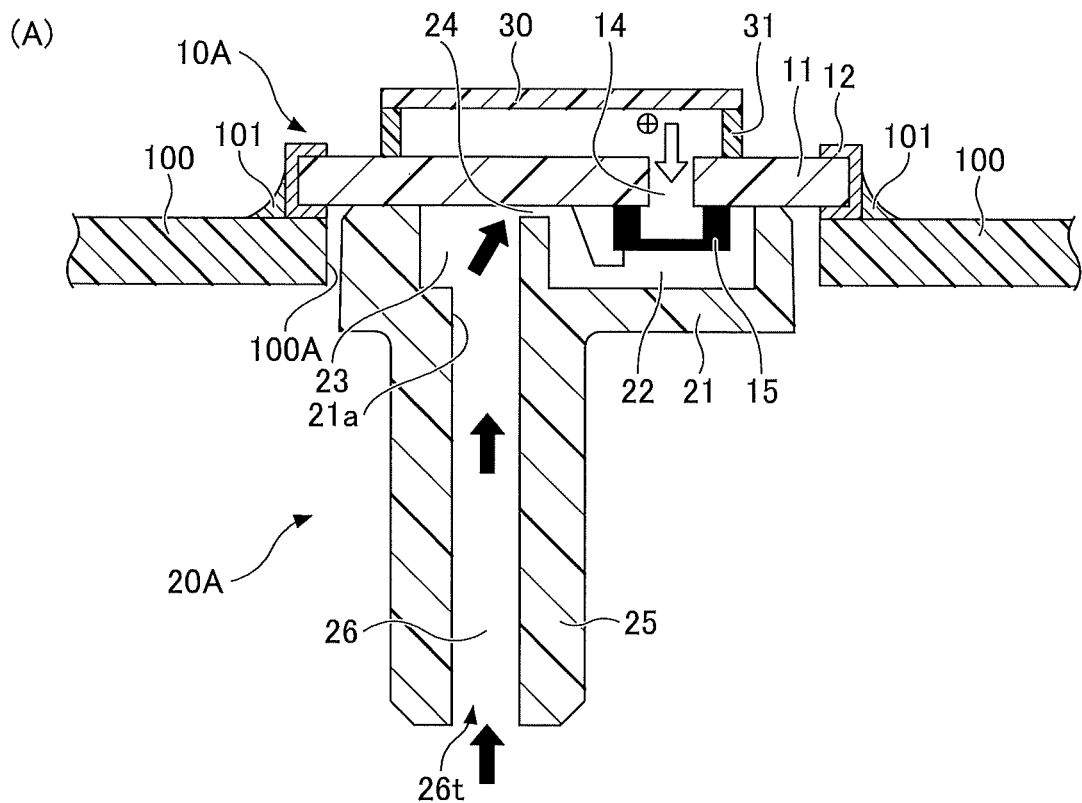
FIG. 7 is cross-sectional views of another example of the pressure sensor device of the first embodiment mounted on a motherboard.
Figure 7:
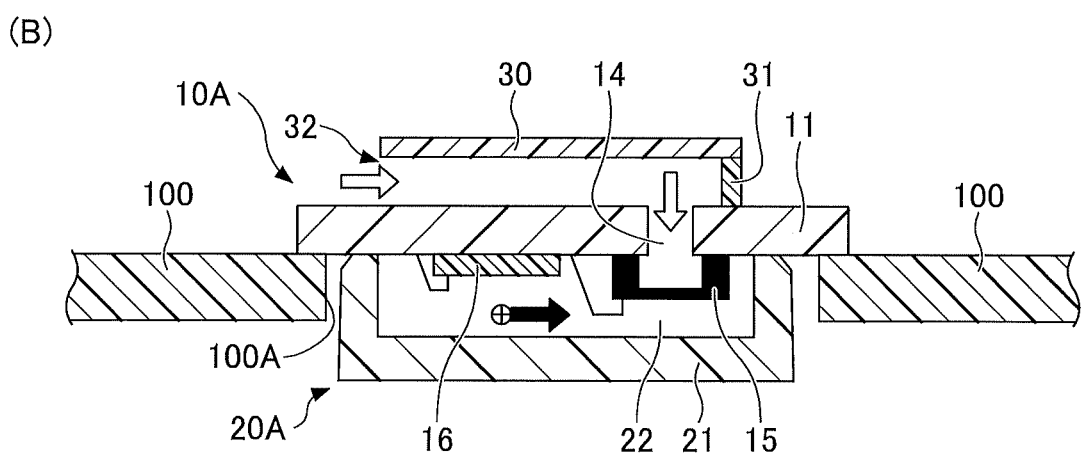

FIG. 7(A) and FIG. 7(B) are cross-sectional views of another example where the pressure sensor device of the present embodiment is mounted on a motherboard, and correspond to cross sections obtained by inverting FIG. 4(A) and FIG. 4(B). In FIG. 7(A) and FIG. 7(B), the pressure sensor device is mounted on the motherboard 100 such that the tubular part 25 faces downward with respect to the motherboard 100.

The pressure sensor device is mounted on the motherboard 100 such that the cover 20A of the pressure sensor device of the present embodiment is placed in the opening 100A of the motherboard 100, and the terminals 12 of the pressure sensor device are connected and fixed to the terminals (not shown) of the motherboard 100 by soldering. In this case, the upper surfaces (surfaces closer to the cover 20A) and the side surfaces of the terminals 12 are connected with solder.

Because the terminals 12 are formed along three surfaces, the upper surface, the side surface, and the lower surface, of the substrate 11 constituting the board 10A, both of the mounting method illustrated in FIG. 6(A) and FIG. 6(B) and the mounting method illustrated in FIG. 7(A) and FIG. 7(B) can be used without changing the configuration of the pressure sensor device.

The board 10A has a rectangular shape in plan view, and the terminals 12 are formed along two opposite sides of the rectangular board 10A. In the examples illustrated in FIGS. 6(A) and (B) and FIGS. 7(A) and (B), the lid opening 32 is open toward a side different from the two opposite sides. When the pressure sensor device is mounted on the motherboard 100, compared with a configuration where the lid opening 32 is open toward the terminals 12, the above configuration can suppress the flux of solder, which is generated near the terminals 12 fixed with solder, from entering the lid opening 32.

In the pressure sensor device according to the present embodiment, the plate-shaped lid 30 is mounted on the lower surface of the board 10A to cover the through hole 14 and is separated at a predetermined distance from the board 10A. Because the through hole 14 is hidden from the outside, this configuration makes it possible to suppress the entry of dust such as flux through the through hole 14 into the pressure sensor element 15.

Also, the pressure sensor device of the present embodiment is implemented without using a lead frame, and the occupied area of the pressure sensor device mounted on a motherboard corresponds to the area of the board 10A. Thus, the present embodiment makes it possible to miniaturize a pressure sensor device. Because the pressure sensor device of the present embodiment is implemented by using inexpensive injection molded parts instead of using high-cost insert molding, the present embodiment can reduce costs.

Further, in the pressure sensor device of the present embodiment, the pressure sensor element 15 is not disposed immediately below the tubular-part upper-end opening 26t. With this configuration, even if dust enters from the tubular-part upper-end opening 26t, the dust is trapped in the second recess 23 located immediately below the tubular-part upper-end opening 26t and cannot readily reach the pressure sensor element 15. The second recess 23 functions as a dust trap. A structure that functions as a dust trap can be easily implemented by providing the second recess 23 and a channel communicating with the second recess 23 in the cover.

Second Embodiment

Figure 8:
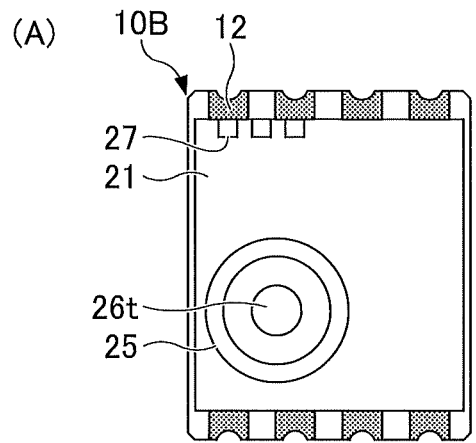
FIG. 8 is a top plan view (A), a side view (B), a side view (C), and a bottom plan view (D) of a pressure sensor device according to a second embodiment.
Figure 8:
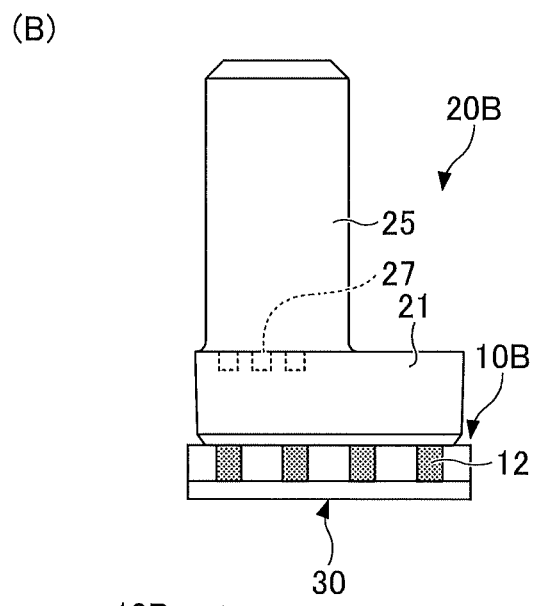
Figure 8:
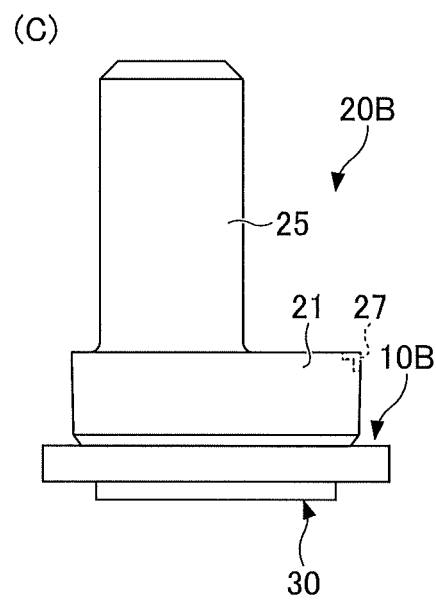
Figure 8:
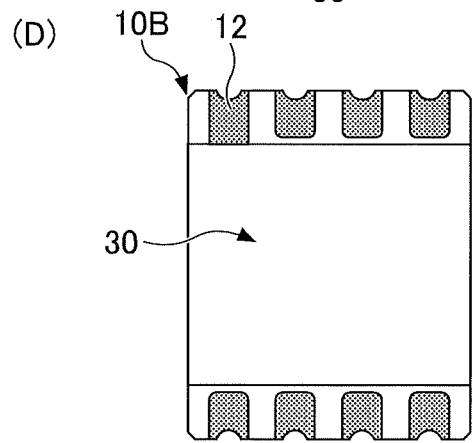

In the present embodiment, descriptions of components that are the same as those in the first embodiment are omitted. FIG. 8(A) is a top plan view, FIG. 8(B) and FIG. 8(C) are side views, and FIG. 8(D) is a bottom plan view of a pressure sensor device according to the present embodiment. A cover 20B is mounted on the upper surface of a board 10B, and a lid 30 is mounted on the lower surface of the board 10B.

The board 10B is shaped like a rectangular plate in plan view. Multiple terminals 12 are arranged along two opposite sides of the board 10B. The cover 20B is a resin molded product and includes a box-shaped part 21 and a tubular part 25. At an upper corner (upper-end corner) of the box-shaped part 21, a box-shaped-part opening(s) 27 is formed as a first pressure inlet. The tubular part 25 is a tubular structure having a columnar outer shape, and a tubular-part upper-end opening 26t is provided at an end of the tubular structure as a second pressure inlet.

Figure 9:
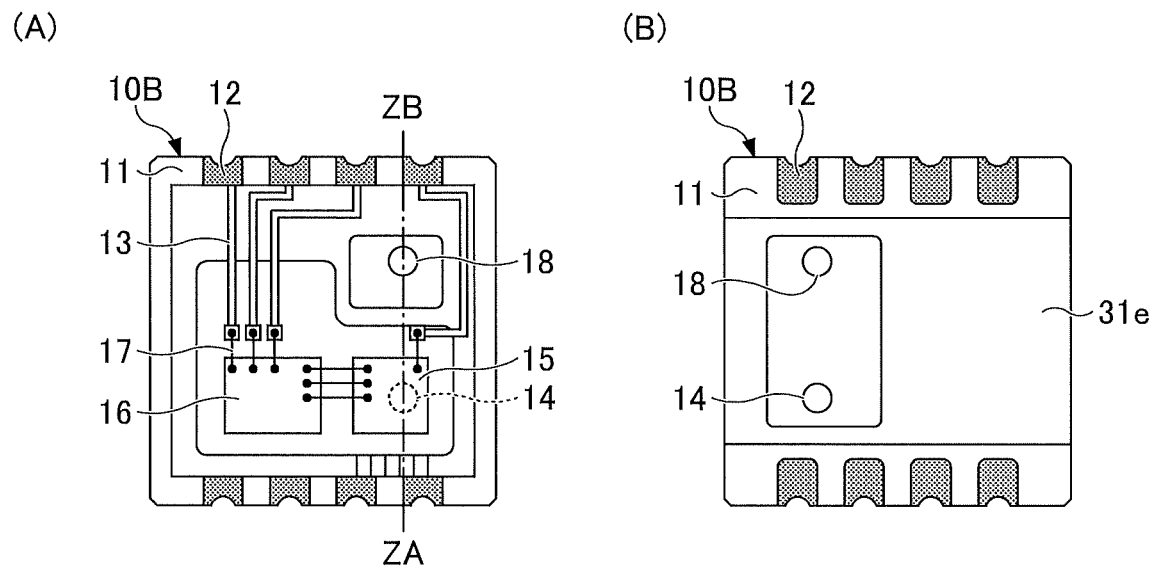
FIG. 9 is a top plan view (A) and a bottom plan view (B) of a board of the pressure sensor device according to the second embodiment.

FIG. 9(A) is a top plan view and FIG. 9(B) is a bottom plan view of the board of the pressure sensor device according to the present embodiment. A through hole 14 and a second through hole 18 are formed in a substrate 11 of the board 10B. Also, on the lower surface of the substrate 11, a metal layer 31e is formed around the through hole 14 and the second through hole 18. Except for the above differences, the board 10B has substantially the same configuration as the board 10A of the first embodiment. As illustrated in FIG. 9(A), the through hole 14 and the second through hole 18 are located on a dashed-dotted line ZA-ZB in the drawing. However, one or both of the through hole 14 and the second through hole 18 may be located off the dashed-dotted line ZA-ZB.

Figure 10:
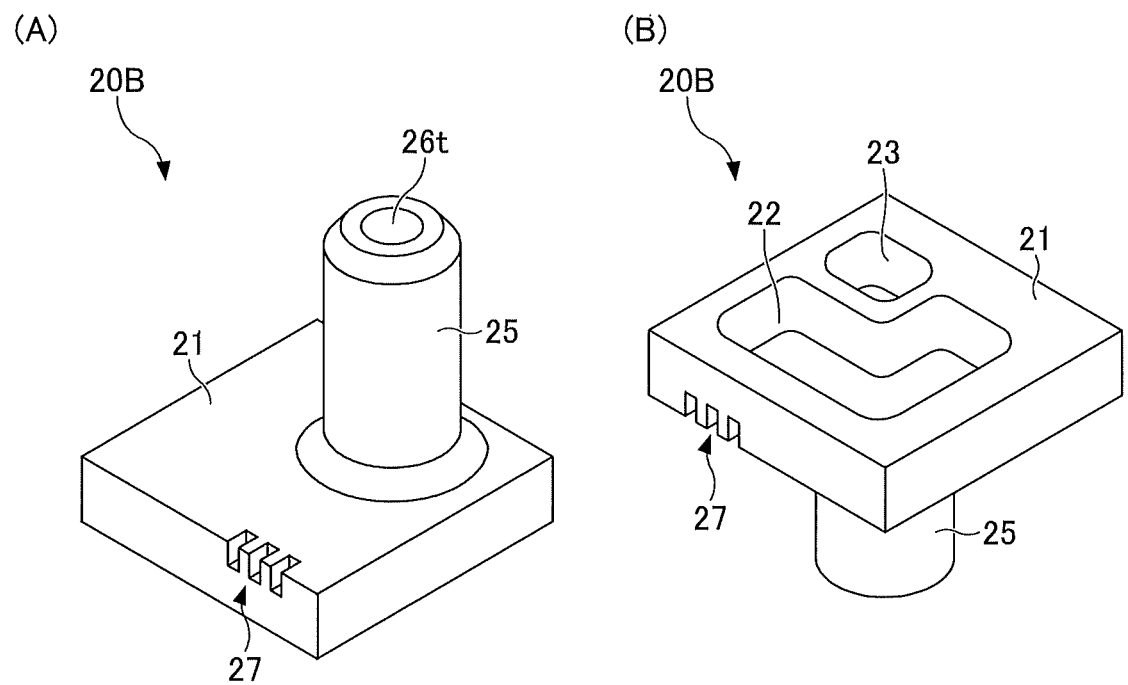
FIG. 10 is a top perspective view (A) and a bottom perspective view (B) of a cover of the pressure sensor device according to the second embodiment.

FIG. 10(A) is a top perspective view and FIG. 10(B) is a bottom perspective view of the cover of the pressure sensor device according to the present embodiment. The cover 20B includes the box-shaped part 21 and the tubular part 25. A first recess 22 and a second recess 23 are formed in the surface of the box-shaped part 21 to be bonded to the board 10B. When the cover 20B is mounted on the board 10B, a hollow structure (first hollow part) is formed by the surface of the board 10B and the inner surface of the first recess 22 of the cover 20B. Also, a hollow structure (second hollow part) is formed by the surface of the board 10B and the inner surface of the second recess 23 of the cover 20B.

The pressure sensor element 15 and the control chip 16 on the board 10B are housed in the space in the first hollow part. The second through hole 18 is located immediately below the second hollow part and communicates with the second hollow part. The tubular part 25 is provided on a portion of the box-shaped part 21 above the second recess 23.

The opening structure starting from the tubular-part upper-end opening 26t of the tubular part 25 passes through the tubular part 25 and the box-shaped part 21 and reaches the second recess 23. Also, the box-shaped-part opening 27 leading to the first recess 22 is formed in an upper corner of the box-shaped part 21. The box-shaped-part opening 27 may be formed in the upper surface or a side surface of the box-shaped part 21. Further, the box-shaped-part opening 27 may be formed in both of the upper surface and the side surface, and may be formed in the upper corner of the box-shaped part 21 as described above.

Figure 11:
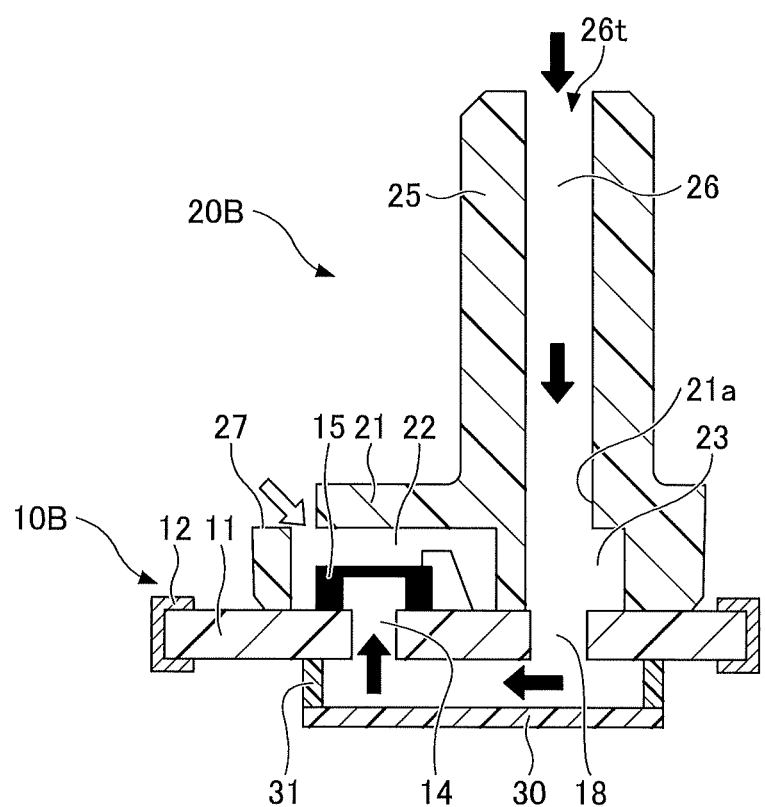
FIG. 11 is a cross-sectional view of the pressure sensor device according to the second embodiment.

FIG. 11 is a cross-sectional view of the pressure sensor device according to the present embodiment and corresponds to a cross section taken along line ZA-ZB in FIG. 9(A). As described above, the box-shaped-part opening 27 formed in the corner of the box-shaped part 21 of the cover 20B leads to the first recess 22 and constitutes a first channel that guides a first fluid to the upper surface of the diaphragm structure of the pressure sensor element 15. This fluid flow is indicated by a white arrow. The first fluid is, for example, a comparison target fluid for pressure measurement.

A plate-shaped lid 30 is disposed at a predetermined distance from the lower surface of the board 10B to cover the through hole 14. The lid 30 is separated from the board 10B by a side wall 31, and a hollow structure (third hollow part) is formed by the lower surface of the board 10B and the inner surfaces of the lid 30 and the side wall 31. The side wall 31 is substantially the same as that in the first embodiment except that the lid opening is not formed.

The opening structure starting from the tubular-part upper-end opening 26*t* of the tubular part 25 reaches the second recess 23 through the tubular-part opening 26 inside of the tubular part 25 and a box-shaped-part through hole 21*a*. The second recess 23 communicates via the second through hole 18 with the third hollow part formed by the lower surface of the board 10B and the inner surfaces of the lid 30 and the side wall 31. The third hollow part communicates via the through hole 14 with the lower surface of the diaphragm structure of the pressure sensor element 15.

Thus, the opening structure starting from the tubular-part upper-end opening 26*t* communicates with the tubular-part opening 26, the box-shaped-part through hole 21*a*, the second hollow part, the second through hole 18, the third hollow part, and the through hole 14 and forms the second channel that guides the second fluid to the lower surface of the diaphragm structure of the pressure sensor element 15. This fluid flow is indicated by black arrows. The second fluid is, for example, a pressure measurement target fluid.

In the pressure sensor device of the present embodiment, the board 10B has a rectangular shape in plan view. The terminals 12 are formed along two opposite sides of the rectangular board 10B. As illustrated in, for example, FIG. 8, the box-shaped-part opening(s) 27 is open on the two opposite sides where the terminals are formed. A configuration where the box-shaped-part opening 27 is open toward a side different from the opposite two sides where the terminals are formed is preferable because this configuration can suppress the flux of solder, which is generated near the terminals 12 that are soldered when the pressure sensor device is mounted, from entering the box-shaped-part opening 27.

Figure 12:
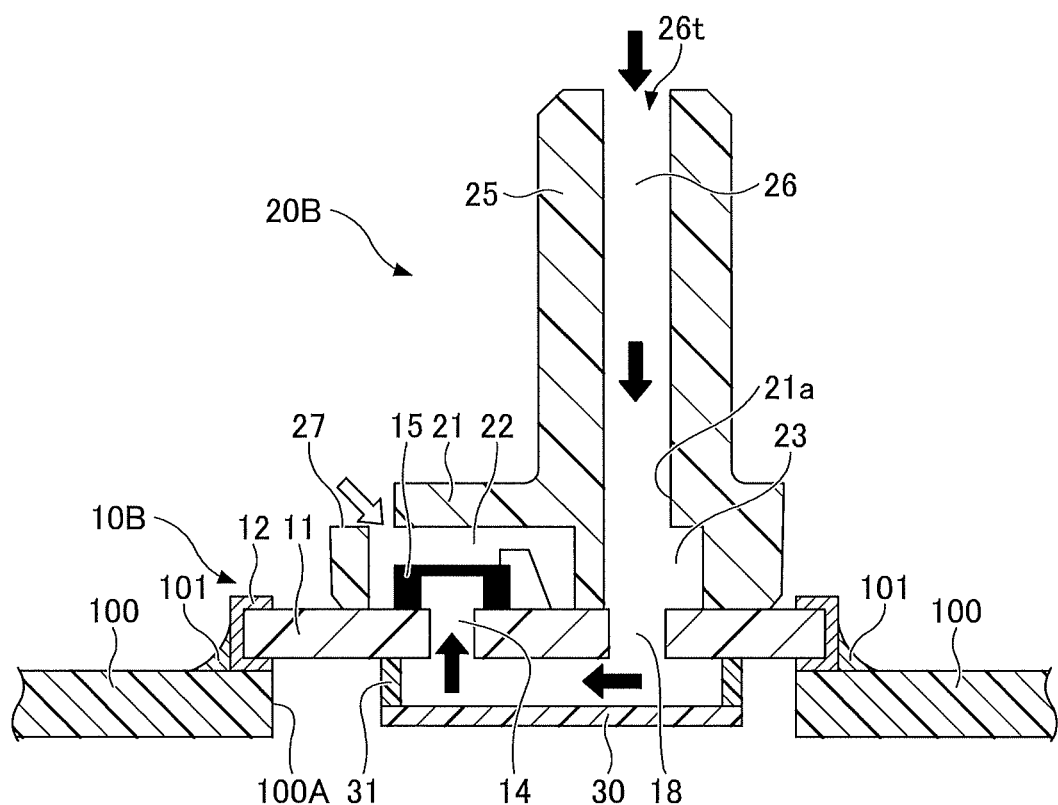
FIG. 12 is a cross-sectional view of an example of the pressure sensor device of the second embodiment mounted on a motherboard.

FIG. 12 is a cross-sectional view of an example where the pressure sensor device according to the present embodiment is mounted on a motherboard. In FIG. 12, the pressure sensor device is mounted on a motherboard 100 such that the tubular part 25 faces upward with respect to the motherboard 100. The motherboard 100 is a glass epoxy resin board such as FR-4. Terminals and wiring patterns (not shown) are formed on the surface of the motherboard 100. An opening 100A is formed in the motherboard 100. The pressure sensor device is mounted on the motherboard 100 such that the lid 30 of the pressure sensor device of the present embodiment is placed in the opening 100A, and the terminals 12 of the pressure sensor device are connected and fixed to the terminals (not shown) of the motherboard 100 by soldering. In this case, the lower and side surfaces of the terminals 12 are connected with solder.

Figure 13:
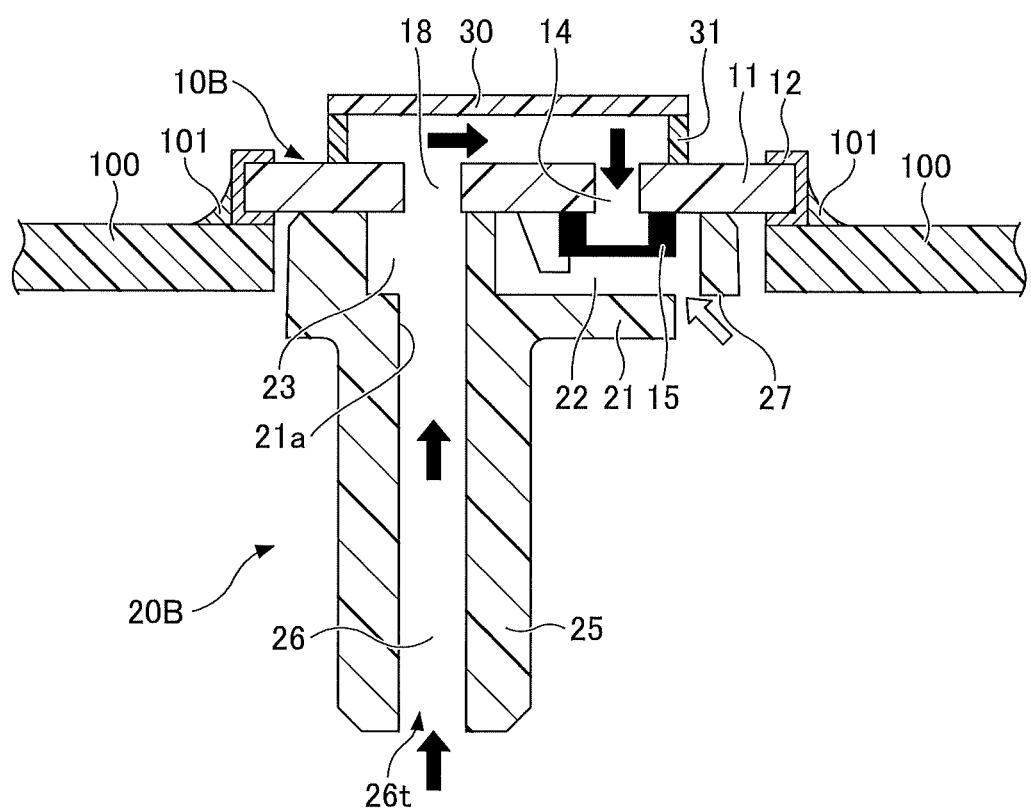
FIG. 13 is a cross-sectional view of another example of the pressure sensor device of the second embodiment mounted on a motherboard.

FIG. 13 is a cross-sectional view of another example where the pressure sensor device according to the present embodiment is mounted on the motherboard, and corresponds to a cross section obtained by inverting FIG. 11. In FIG. 13, the pressure sensor device is mounted on the motherboard 100 such that the tubular part 25 faces downward with respect to the motherboard 100. The pressure sensor device is mounted on the motherboard 100 such that the cover 20B of the pressure sensor device of the present embodiment is placed in the opening 100A of the motherboard 100, and the terminals 12 of the pressure sensor device are connected and fixed to the terminals (not shown) of the motherboard 100 by soldering. In this case, the upper surfaces (surfaces closer to the cover 20B) and the side surfaces of the terminals 12 are connected with solder. Similarly to the first embodiment, because the terminals 12 are formed along three surfaces, the upper surface, the side surface, and the lower surface, of the substrate 11 constituting the board 10B, both of the mounting method illustrated in FIG. 12 and the mounting method illustrated in FIG. 13 can be used without changing the configuration of the pressure sensor device.

In the pressure sensor device according to the present embodiment, the plate-shaped lid 30 is mounted on the lower surface of the board 10B to cover the through hole 14 and is separated at a predetermined distance from the board 10B. Because the through hole 14 is hidden from the outside, this configuration makes it possible to suppress the entry of dust such as flux through the through hole 14 into the pressure sensor element 15.

Also, the pressure sensor device of the present embodiment is implemented without using a lead frame, and the occupied area of the pressure sensor device mounted on a motherboard corresponds to the area of the board 10B. Thus, the present embodiment makes it possible to miniaturize a pressure sensor device. Because the pressure sensor device is implemented by using inexpensive injection molded parts instead of using high-cost insert molding, the present embodiment can reduce costs.

Further, in the pressure sensor device of the present embodiment, the pressure sensor element 15 is not disposed immediately below the tubular-part upper-end opening 26*t*. With this configuration, even if dust enters from the tubular-part upper-end opening 26*t*, the dust is trapped in the second recess 23 located immediately below the tubular-part upper-end opening 26*t* or the third hollow part and cannot readily reach the pressure sensor element 15. The second recess 23 and the third hollow part function as dust traps. A structure that functions as a dust trap can be easily implemented by providing the second recess 23 and a channel communicating with the second recess 23 in the cover.

First Variation

Figure 14:
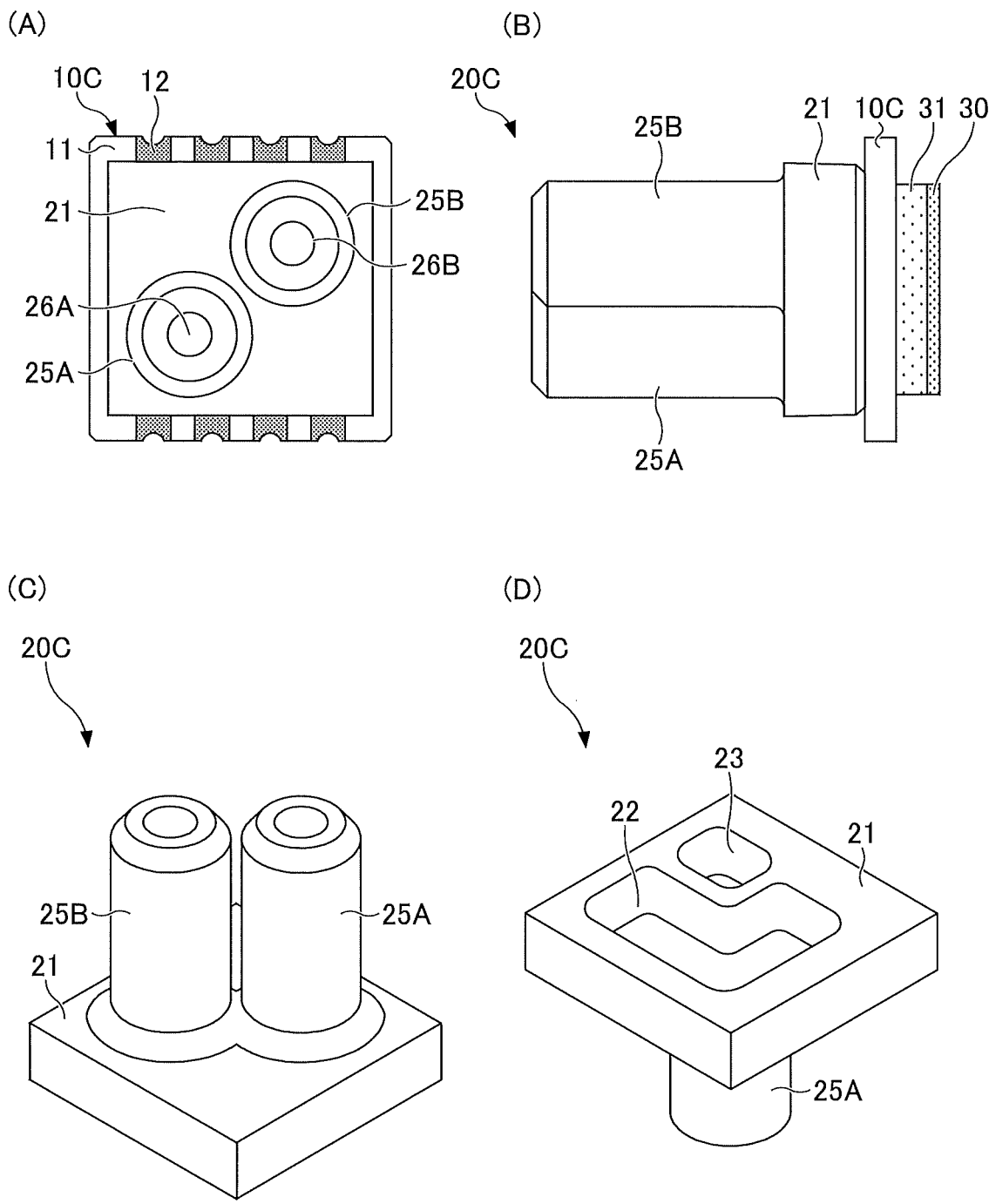
FIG. 14 is a top plan view (A) and a side view (B) of a pressure sensor device and a top perspective view (C) and a bottom perspective view (D) of a cover according to a first variation.

FIG. 14(A) is a top plan view and FIG. 14(B) is a side view of a pressure sensor device according to a first variation; and FIG. 14(C) is a top perspective view and FIG. 14(D) is a bottom perspective view of a cover. A cover 20C is mounted on the upper surface of a board 10C, and a lid 30 is mounted on the lower surface of the board 10C via a side wall 31. The cover 20C includes a box-shaped part 21, a first tubular part 25A, and a second tubular part 25B.

The first tubular part 25A is a tubular structure having a columnar outer shape, and a tubular-part upper-end opening 26A is provided at an end of the tubular structure as a second pressure inlet. The second tubular part 25B is a tubular structure having a columnar outer shape, and a tubular-part upper-end opening 26B is provided at an end of the tubular structure as a first pressure inlet. The first tubular part 25A is provided on a portion of the box-shaped part 21 above the second recess 23 and similarly to the second embodiment, the tubular-part upper-end opening 26A communicates with the lower surface of the diaphragm structure of the pressure sensor element 15 through the second hollow part and the third hollow part.

On the other hand, in this variation, instead of the box-shaped-part opening 27 in the second embodiment, the second tubular part 25B is provided on a portion of the box-shaped part 21 above the first recess 22. The tubular-part upper-end opening 26B communicates with the upper surface of the diaphragm structure of the pressure sensor element 15 in the first hollow part.

In the pressure sensor device according to this variation, fluids other than air are introduced from the first tubular part 25A and the second tubular part 25B to the pressure sensor element 15, and the pressure difference between the two fluids can be obtained as information.

Second Variation

Figure 15:
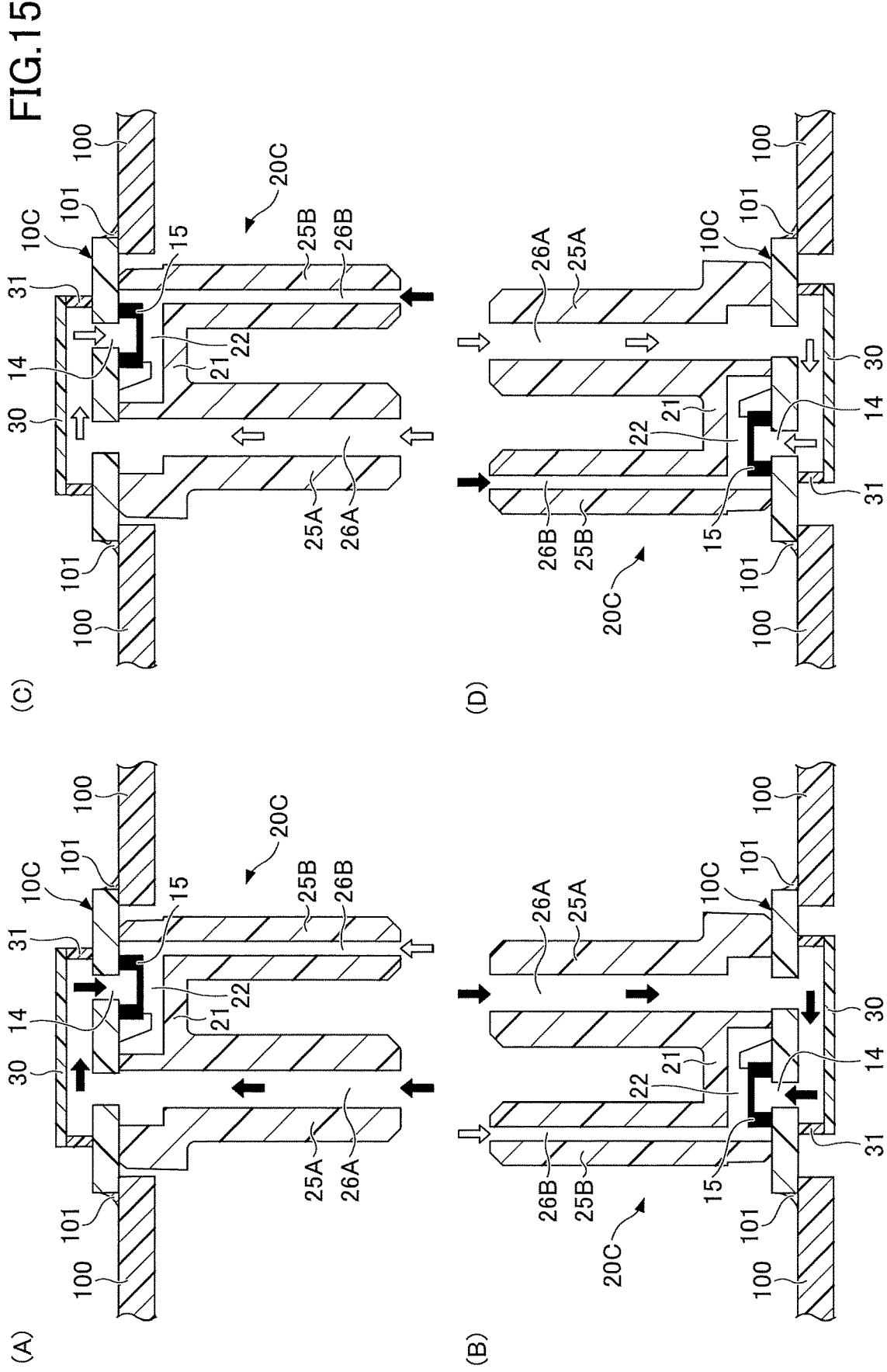
FIG. 15 is cross-sectional views of a pressure sensor device according to a second variation.

FIG. 15(A) is a cross-sectional view of a pressure sensor device according to an example of a second variation. The pressure sensor device of the first variation is mounted on the motherboard 100. Here, the pressure sensor device is mounted such that the first tubular part 25A and the second tubular part 25B face downward with respect to the motherboard 100. A pressure measurement target fluid (black arrow) is introduced into the first tubular part 25A, and a pressure measurement comparison target fluid (white arrow) is introduced into the second tubular part 25B.

FIG. 15(B) is a cross-sectional view of a pressure sensor device according to another example of the second variation. The pressure sensor device of the first variation is mounted on the motherboard 100. Here, the pressure sensor device is mounted such that the first tubular part 25A and the second tubular part 25B face upward with respect to the motherboard 100. A pressure measurement target fluid (black arrow) is introduced into the first tubular part 25A, and a pressure measurement comparison target fluid (white arrow) is introduced into the second tubular part 25B.

FIG. 15(C) is a cross-sectional view of a pressure sensor device according to another example of the second variation. The pressure sensor device of the first variation is mounted on the motherboard 100. Here, the pressure sensor device is mounted such that the first tubular part 25A and the second tubular part 25B face downward with respect to the motherboard 100. A pressure measurement comparison target fluid (white arrow) is introduced into the first tubular part 25A, and a pressure measurement target fluid (black arrow) is introduced into the second tubular part 25B.

FIG. 15(D) is a cross-sectional view of a pressure sensor device according to another example of the second variation. The pressure sensor device of the first variation is mounted on the motherboard 100. Here, the pressure sensor device is mounted such that the first tubular part 25A and the second tubular part 25B face upward with respect to the motherboard 100. A pressure measurement comparison target fluid (white arrow) is introduced into the first tubular part 25A, and a pressure measurement target fluid (black arrow) is introduced into the second tubular part 25B.

Third Variation

Figure 16:
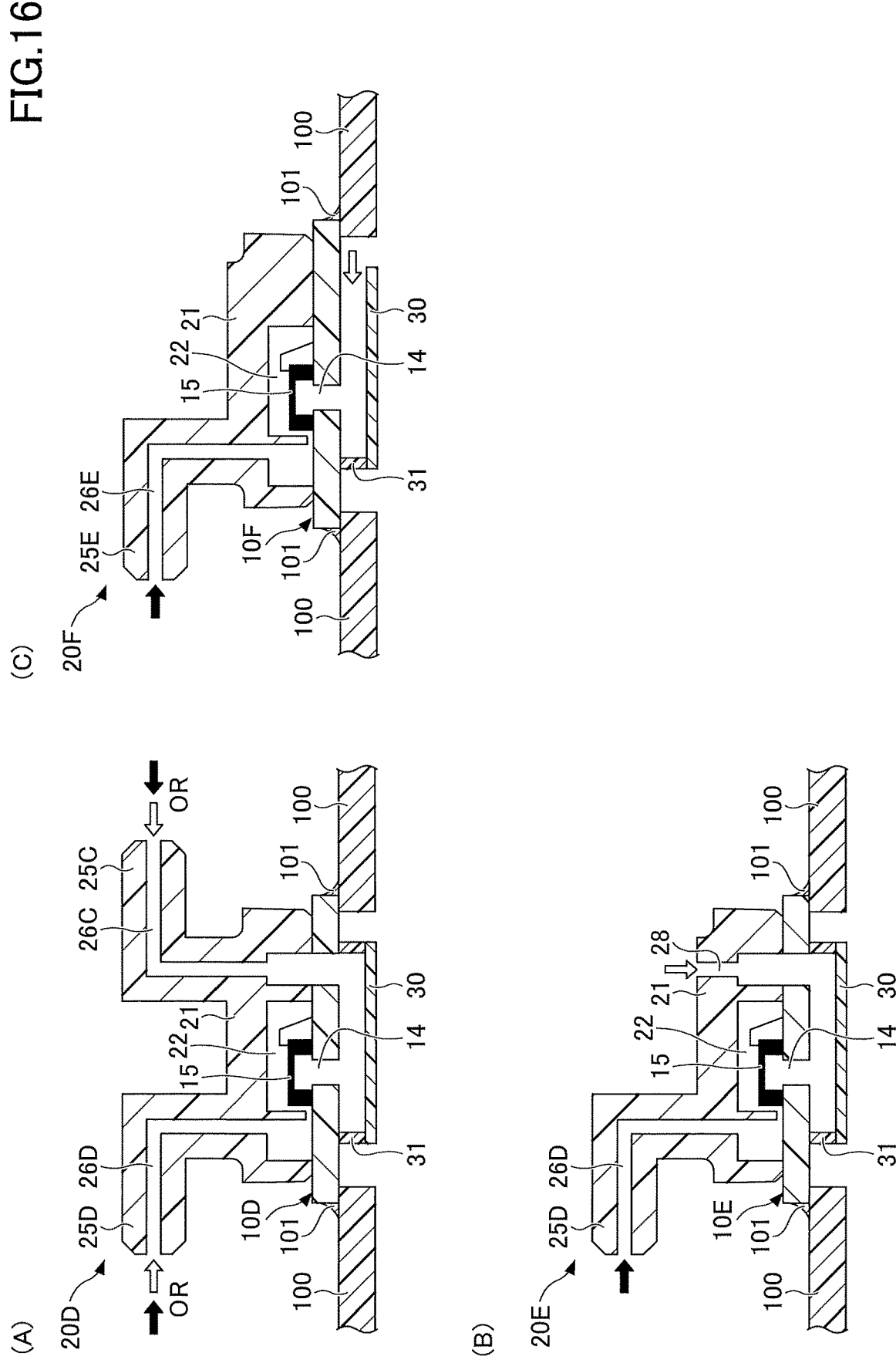
FIG. 16 is cross-sectional views of pressure sensor devices according to third through fifth variations.

FIG. 16(A) is a cross-sectional view of a configuration where a pressure sensor device according to an example of a third variation is mounted on the motherboard 100. Instead of the cylindrical first tubular part 25A in the second variation, a first tubular part 25C whose end is bent outward is formed. Also, instead of the cylindrical second tubular part 25B in the second variation, a second tubular part 25D whose end is bent outward is formed. The pressure sensor device is mounted such that the first tubular part 25C and the second tubular part 25D face upward with respect to the motherboard 100.

Either a pressure measurement target fluid (black arrow) or a pressure measurement comparison target fluid (white arrow) is introduced into each of the first tubular part 25C and the second tubular part 25D. In FIG. 16(A), the first hollow part formed in the cover 20D is implemented by two recesses that communicate with each other. However, the first hollow part may have any other configuration.

Fourth Variation

FIG. 16(B) is a cross-sectional view of a configuration where a pressure sensor device according to an example the fourth variation is mounted on the motherboard 100. This corresponds to a configuration obtained by removing the first tubular part 25C of the pressure sensor device of the third variation. An opening 28 is formed in the upper surface of the box-shaped part 21 of a cover 20E to form a channel communicating with the lower surface of the diaphragm structure of the pressure sensor element 15. For example, a pressure measurement target fluid (black arrow) is introduced into the second tubular part 25D, and a pressure measurement comparison target fluid (white arrow) is introduced into the opening 28 in the upper surface of the box-shaped part 21.

Fifth Variation

FIG. 16(C) is a cross-sectional view of a configuration where a pressure sensor device according to a fifth variation is mounted on the motherboard 100. This configuration is obtained by replacing the tubular part 25 in the pressure sensor device of the first embodiment with a tubular part 25E whose end is bent outward. The pressure sensor device is mounted such that the tubular part 25E faces upward with respect to the motherboard 100. A pressure measurement target fluid (black arrow) is introduced into the tubular part 25E, and a pressure measurement comparison target fluid (white arrow) is introduced into the lid opening of the lid 30.

In each of the pressure sensor devices of the variations described above, the plate-shaped lid 30 is mounted on the lower surface of the board to cover the through hole 14 and is separated by a predetermined distance from the board. Because the through hole 14 is hidden from the outside, this configuration makes it possible to suppress the entry of dust such as flux through the through hole 14 into the pressure sensor element 15.

Also, the pressure sensor devices of the above-described variations are implemented without using a lead frame, and the occupied area of each of the pressure sensor devices mounted on a motherboard corresponds to the area of the board. Thus, the configurations of the variations make it possible to miniaturize a pressure sensor device. Because the pressure sensor devices of the variations are implemented by using inexpensive injection molded parts instead of using high-cost insert molding, the configurations of the variations can reduce costs.

Third Embodiment

Figure 17:
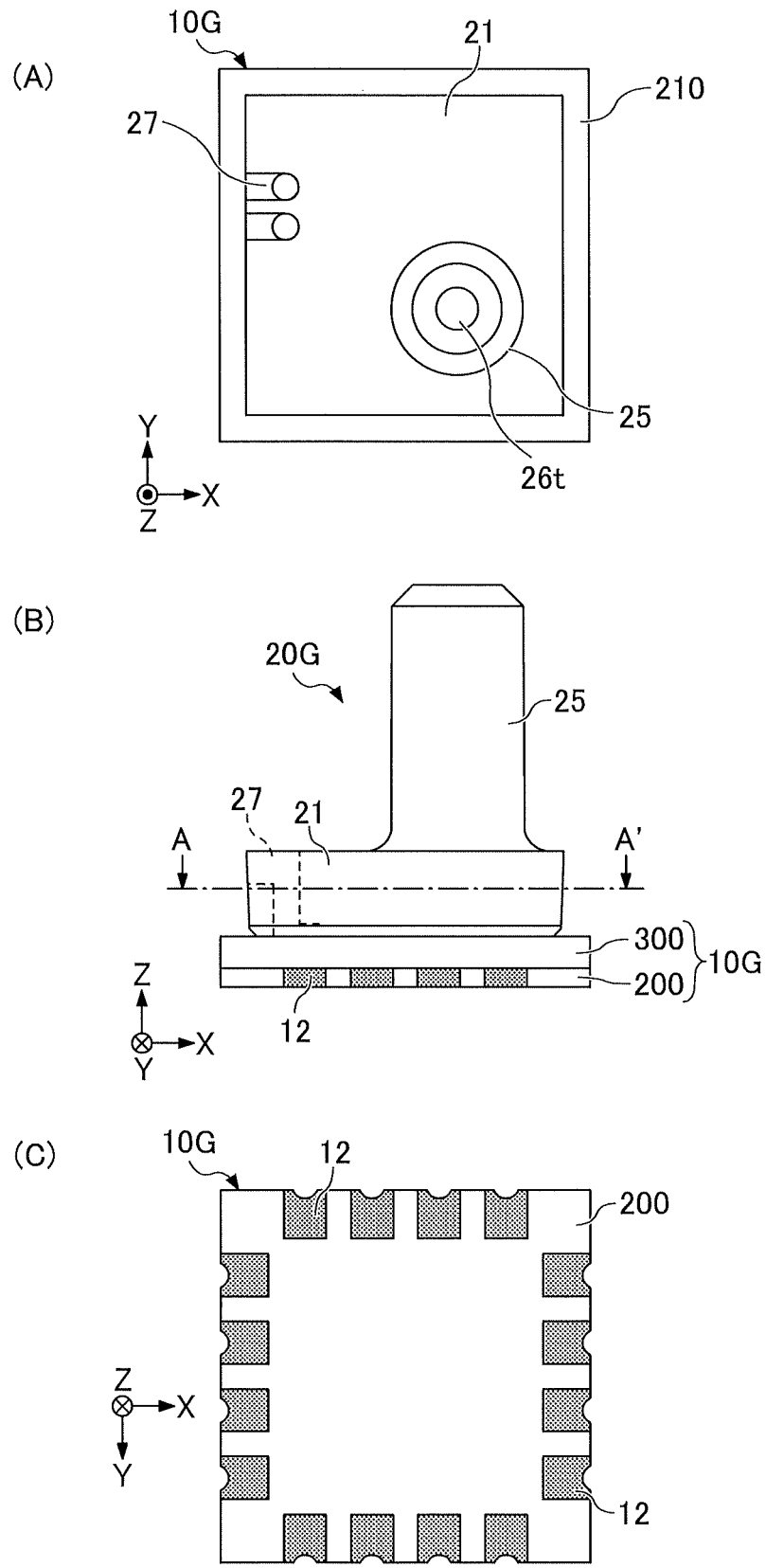
FIG. 17 is a top plan view (A), a side view (B), and a bottom plan view (C) of a pressure sensor device according to a third embodiment.

In the present embodiment, descriptions of components that are the same as those in the first embodiment are omitted. FIG. 17(A) is a top plan view, FIG. 17(B) is a side view, and FIG. 17(C) is a bottom plan view of a pressure sensor device according to the present embodiment.

A cover 20G is mounted on the upper surface of a board 10G. The board 10G is shaped like a plate having a rectangular shape in plan view. In the present embodiment, multiple terminals 12 are arranged on each of the four sides of the board 10G. The cover 20G is a resin molded product and includes a box-shaped part 21 and a tubular part 25. At an upper corner (upper-end corner) of the box-shaped part 21, a box-shaped-part opening(s) 27 is formed as a first pressure inlet. The tubular part 25 is a tubular structure having a columnar outer shape, and a tubular-part upper-end opening 26t is provided at an end of the tubular structure as a second pressure inlet.

In the present embodiment, the board 10G includes a first board 200 on which the multiple terminals 12 are provided and a second board 300 stacked on the first board 200 and having a through hole described later. The first board 200 and the second board 300 are bonded together using a bonding sheet described later.

No through hole is formed in the first board 200. In the present embodiment, the first board 200 functions as a lid.

Unlike the first and second embodiments, no metal layer other than the terminals 12 is formed on the lower surface of the first board 200, and a region other than the terminals 12 is covered with a resist layer.

Figure 18:
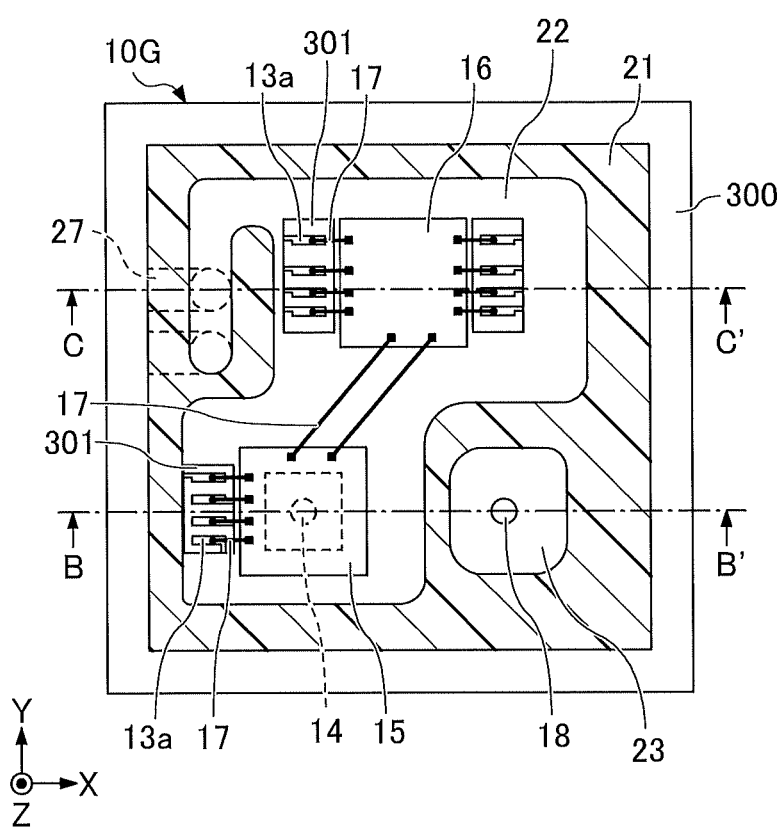
FIG. 18 is a cross-sectional view taken along line A-A' in FIG. 17(B)

FIG. 18 is a cross-sectional view of the pressure sensor device according to the present embodiment, and corresponds to a cross section taken along A-A' in FIG. 17(B). A first through hole 14 and a second through hole 18 are formed in the second board 300. The pressure sensor element 15 and the control chip 16 are mounted on the second board 300. The pressure sensor element 15 is mounted on the upper surface of the second board 300 using an adhesive such as a silicone resin to close the first through hole 14.

Land openings 301 are formed in portions of the second board 300 near the pressure sensor element 15 and the control chip 16 to expose lands 13a of wires 13 provided on the first board 200. Bonding wires 17 connect the pressure sensor element 15 to the control chip 16, connect the pressure sensor element 15 to the lands 13a of the wires 13, and connect the control chip 16 to the lands 13a of the wires 13.

Figure 19:
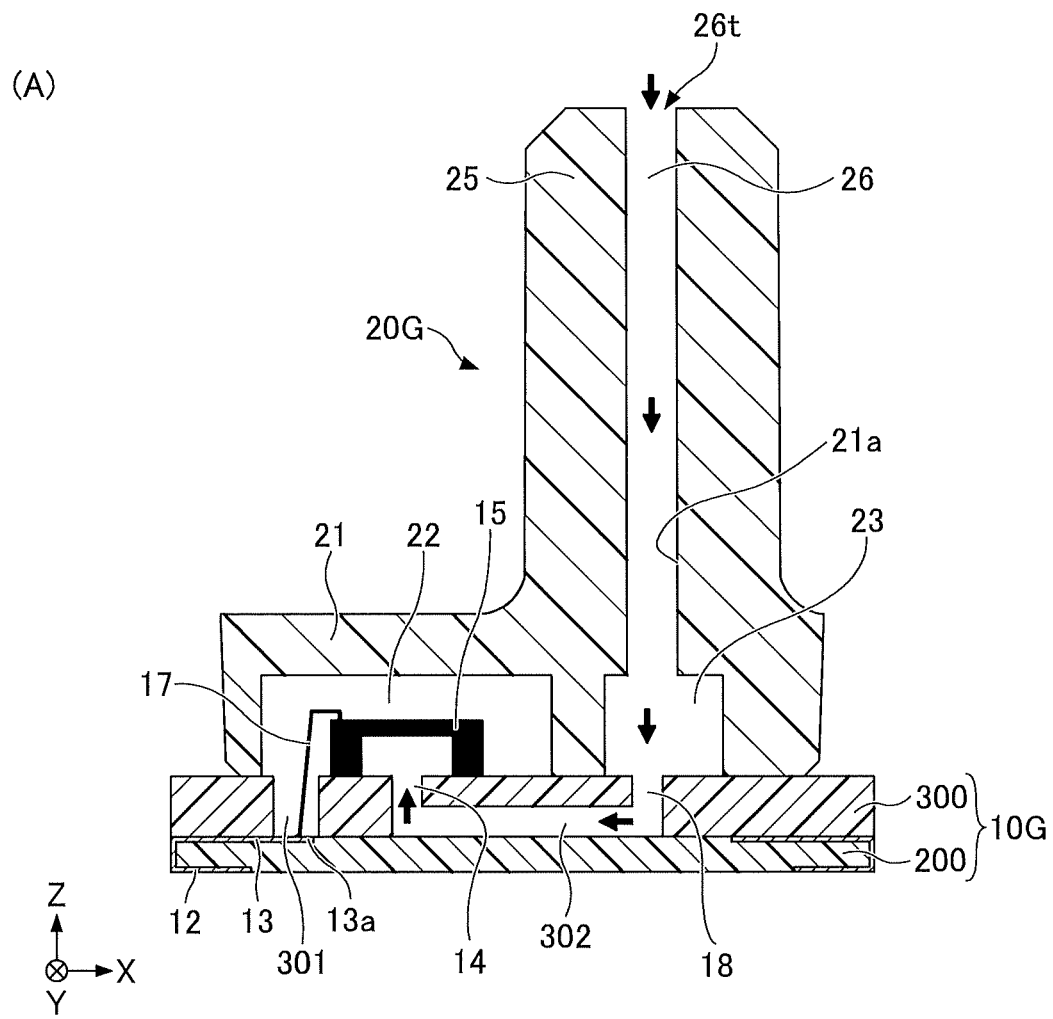
FIG. 19 is a cross-sectional view (A) taken along line B-B' and a cross-sectional view (B) taken along line C-C' in FIG. 18.
Figure 19:
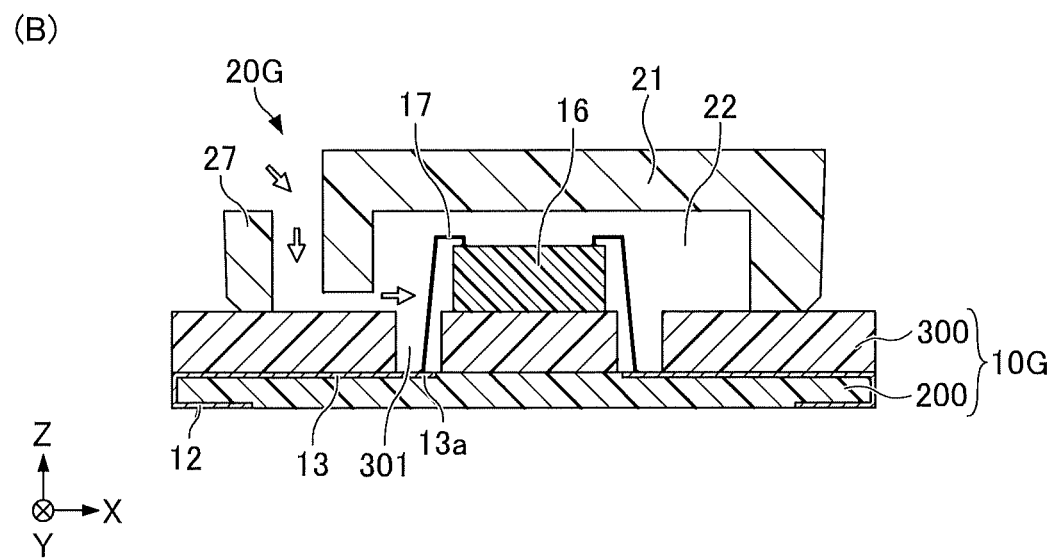

FIG. 19 is cross-sectional views of the pressure sensor device according to the present embodiment. FIG. 19(A) corresponds to a cross section taken along line B-B' in FIG. 18. FIG. 19(B) corresponds to a cross section taken along line C-C' in FIG. 18. Similarly to the second embodiment, in the present embodiment, the first recess 22 and the second recess 23 are formed in a surface of the box-shaped part 21 to be bonded to the board 10G.

When the cover 20G is mounted on the board 10G, a hollow structure (first hollow part) is formed by the surface of the board 10G and the inner surface of the first recess 22 of the cover 20G. Also, a hollow structure (second hollow part) is formed by the surface of the board 10G and the inner surface of the second recess 23 of the cover 20G.

The pressure sensor element 15 and the control chip 16 on the board 10G are housed in the space in the first hollow part. The second through hole 18 is located immediately below the second hollow part and communicates with the second hollow part. The tubular part 25 is provided on the box-shaped part 21. The opening structure starting from the tubular-part upper-end opening 26t of the tubular part 25 passes through the tubular part 25 and the box-shaped part 21 and reaches the second recess 23.

A box-shaped-part opening 27 leads to the first recess 22 and constitutes a first channel that guides a first fluid to the upper surface of the diaphragm structure of the pressure sensor element 15. The fluid flow is indicated by white arrows in FIG. 19 (B). The first fluid is, for example, a pressure measurement comparison target fluid.

Also, a recess 302 is formed in the second board 300 constituting the board 10G to face the first board 200. The recess 302 communicates with the first through hole 14 and the second through hole 18. A hollow structure (third hollow part) is formed by the surface of the first board 200 and the inner surface of the recess 302 of the second board 300. As described later, a recess may also be formed in a region of the surface of the first board 200 facing the recess 302.

The opening structure starting from the tubular-part upper-end opening 26t reaches the second recess 23 through the tubular-part opening 26 inside of the tubular part 25 and the box-shaped-part through hole 21a. The second recess 23 communicates via the second through hole 18 with the third hollow part. The third hollow part communicates via the through hole 14 with the lower surface of the diaphragm structure of the pressure sensor element 15. Thus, the opening structure starting from the tubular-part upper-end opening 26t communicates with the tubular-part opening 26, the box-shaped-part through hole 21a, the second hollow part, the second through hole 18, the third hollow part, and the through hole 14 and forms the second channel that guides the second fluid to the lower surface of the diaphragm structure of the pressure sensor element 15. This fluid flow is indicated by black arrows in FIG. 19(A). The second fluid is, for example, a pressure measurement target fluid.

Figure 20:
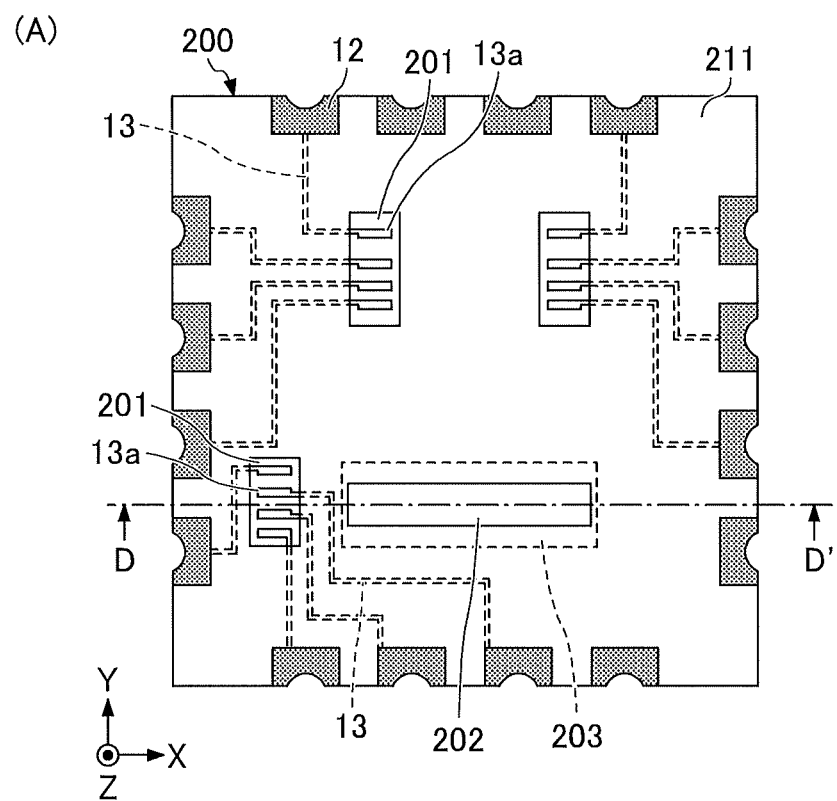
FIG. 20 is a top plan view (A) of a first board and a cross-sectional view (B) taken along line D-D' in FIG. 20(A)
Figure 20:
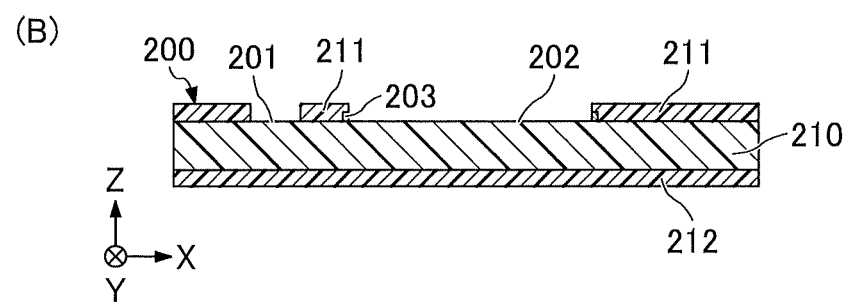

Configurations of the first board 200 and the second board 300 are described below. FIG. 20(A) is a top plan view of the first board 200. FIG. 20(B) is a cross-sectional view of the first board 200 and corresponds to a cross section taken along line D-D' in FIG. 20(A).

The first board 200 includes a substrate 210 as a base. The substrate 210 is formed of, for example, a glass epoxy resin and serves as a body of a plate-shaped structure. A metal layer of, for example, Cu, Ni, or Au and a resist layer are stacked on the upper and lower surfaces of the substrate 210. On the upper surface of the substrate 210, the terminals 12, the wires 13, and the lands 13a are formed by the metal layer. An Au plating layer is preferably formed on the surface of each land 13a.

Also, a resist layer 211 is formed on the upper surface of the substrate 210 to cover the metal layer. Openings 201 for exposing the lands 13a are formed in the resist layer 211. The openings 201 are formed at positions corresponding to the land openings 301 formed in the second board 300 with the same shapes and sizes as the land openings 301.

Further, a region of the resist layer 211 corresponding to the recess 302 of the second board 300 is removed to form a recess 202. The recess 202 has the same shape and size as the recess 302. Although the recess 202 is not essential, when the recess 202 is formed, the recess 202 (first recess) and the recess 302 (second recess) face each other and form the third hollow part that constitutes the second channel.

A frame 203 comprised of a metal layer (e.g., copper foil) is formed around the recess 202. The upper surface of the frame 203 is covered by the resist layer 211. Also, a resist layer 212 is formed in a region of the lower surface of the substrate 210 other than the terminals 12. An Au plating layer is preferably formed on the surface of each terminal 12.

Figure 21:
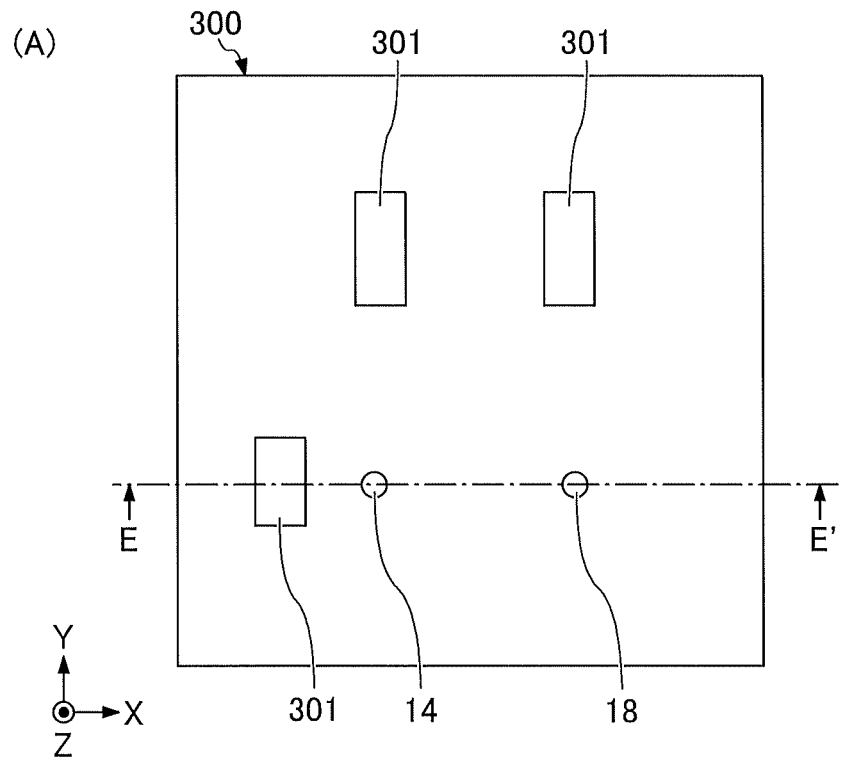
FIG. 21 is a top plan view (A) and a bottom plan view (B) of a second board.
Figure 21:
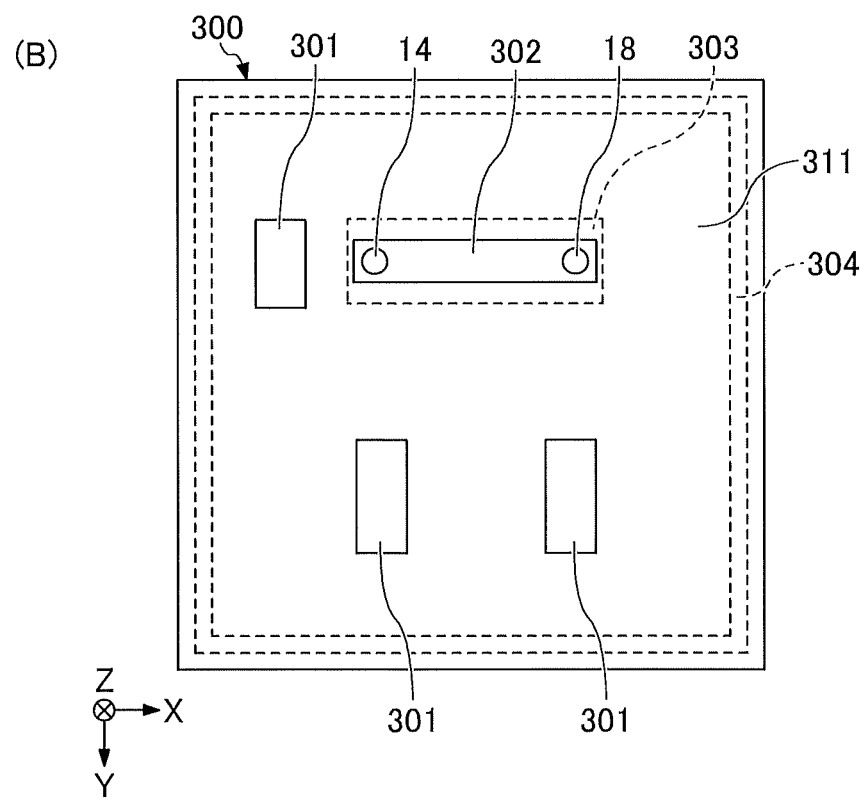
Figure 22:
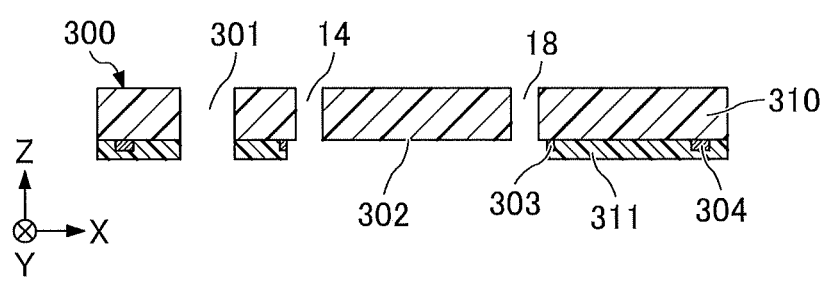
FIG. 22 is a cross-sectional view taken along line E-E' in FIG. 21(A)

FIG. 21(A) is a top plan view of the second board 300, and FIG. 21(B) is a bottom plan view of the second board 300. FIG. 22 is a cross-sectional view of the second board 300 and corresponds to a cross section taken along line E-E' in FIG. 21(A).

The second board 300 includes a substrate 310 as a base. The substrate 310 is formed of, for example, a glass epoxy resin and serves as a body of a plate-shaped structure. A first through hole 14, a second through hole 18, and land openings 301 are formed in the second board 300.

A resist layer 311 is formed on the lower surface of the substrate 310 to cover a metal layer of, for example, Cu. In the resist layer 311, the recess 302 is formed by removing a region including the first through hole 14 and the second through hole 18. Around the recess 302, a frame 303 comprised of a metal layer (e.g., copper foil) is formed. Also, on the lower surface of the substrate 310, a frame 304 comprised of a metal layer (e.g., copper foil) is formed along the outer periphery of the substrate 310.

The frame 303 and the frame 304 are covered by the resist layer 311. Also, regions of the resist layer 311 corresponding to the land openings 301 are removed.

Figure 23:
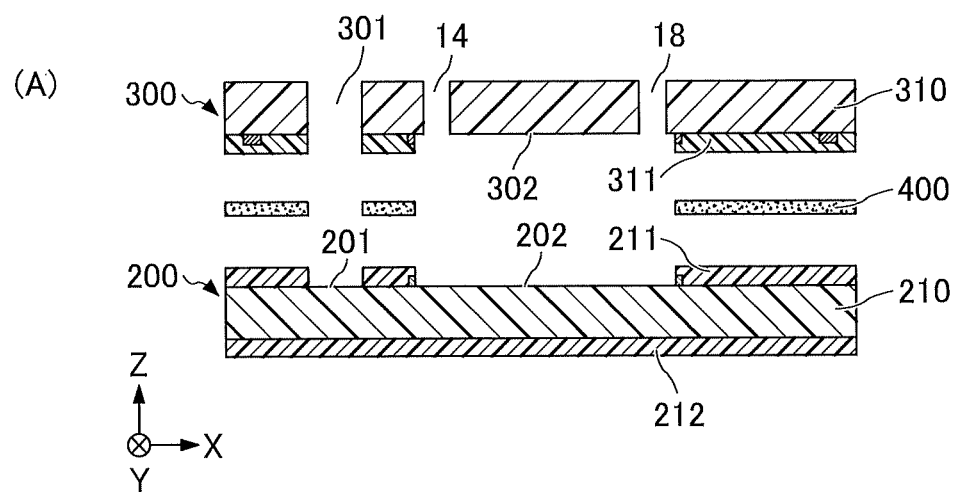
FIG. 23 is cross-sectional view (A) of the first board and the second board before being joined and a cross-sectional view (B) of the first board and the second board after being joined.
Figure 23:
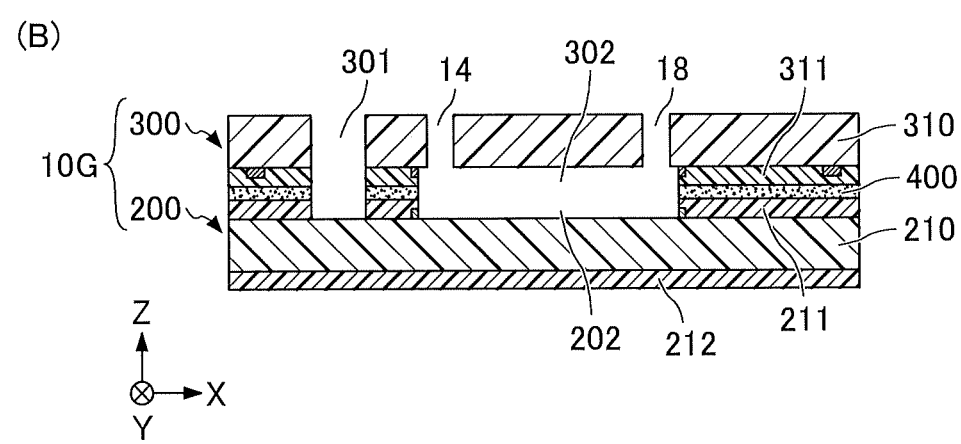

FIG. 23 is a drawing illustrating a method of joining the first board 200 and the second board 300. FIG. 23(A) illustrates a state before the boards are joined and FIG. 23(B) illustrates a state after the boards are joined. As illustrated in FIG. 23(A), the second board 300 is bonded to the first board 200 via a bonding sheet 400. The bonding sheet 400 includes openings formed in regions corresponding to the land openings 301 and the recess 302.

The board 10G is formed by bonding the first board 200 to the second board 300 via the bonding sheet 400 such that the openings 201 and the recess 202 of the first board 200 are aligned with the land openings 301 and the recess 302 of the second board 300.

As described above, the present embodiment makes it possible to easily form the third hollow part constituting the second channel between the first board 200 and the second board 300. In FIG. 23, the second channel is formed by the recess 202 formed in the first board 200 and the recess 302 formed in the second board 300. However, the second channel may be formed by one of the recess 202 and the recess 302.

Variations of the pressure sensor device according to the third embodiment are described below.

First Variation

Figure 24:
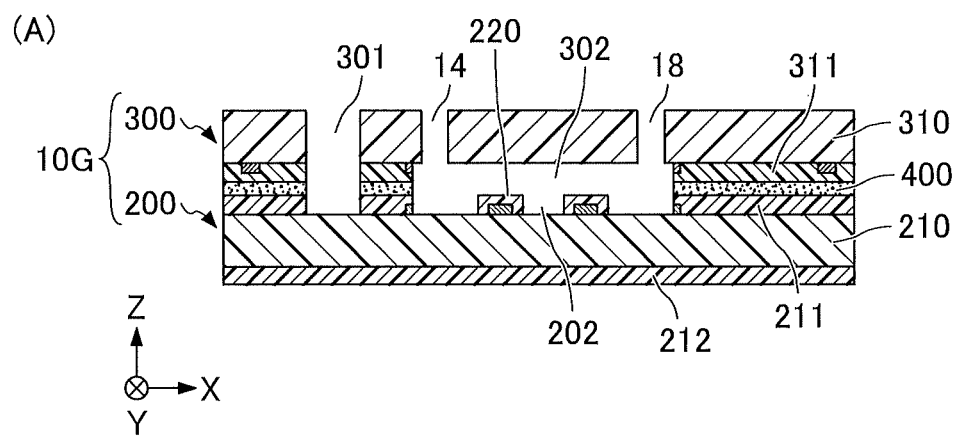
FIG. 24 is a cross-sectional view (A) illustrating a board according to a first variation of the third embodiment and a plan view (B) of a recess of a first board.
Figure 24:
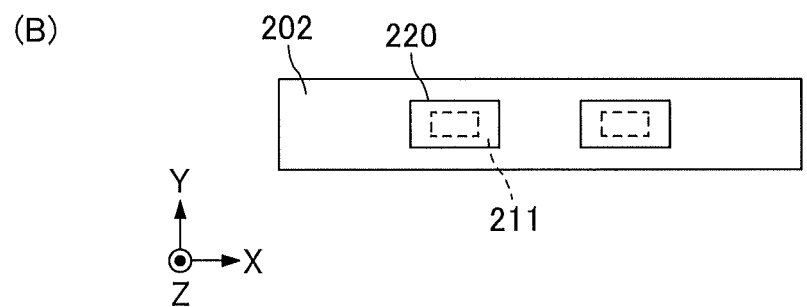

FIG. 24 is a drawing illustrating a board according to a first variation of the third embodiment. FIG. 24(A) is a cross-sectional view. FIG. 24(B) is a plan view of the recess 202. In this variation, protrusions 220 are formed in the recess 202 of the first board 200. The protrusions 220 are formed by patterning the metal layer and the resist layer formed on the upper surface of the substrate 210. In this variation, two rectangular protrusions 220 are disposed in the recess 202. However, the shape and number of the protrusions 220 are not limited to this example.

With the protrusions 220 formed in the recess 202, even when the third hollow part formed by the recess 302 and the recess 202 is flattened by a pressing pressure applied in the vertical direction (Z direction) to the first board 200 or the second board 300, the substrate 210 and the substrate 310 are prevented from contacting each other in the third hollow part, and the second channel can be maintained.

Similar protrusions may also be formed in the recess 302 of the second board 300. Also, protrusions may be formed only in the recess 302 of the second board 300.

Second Variation

Figure 25:
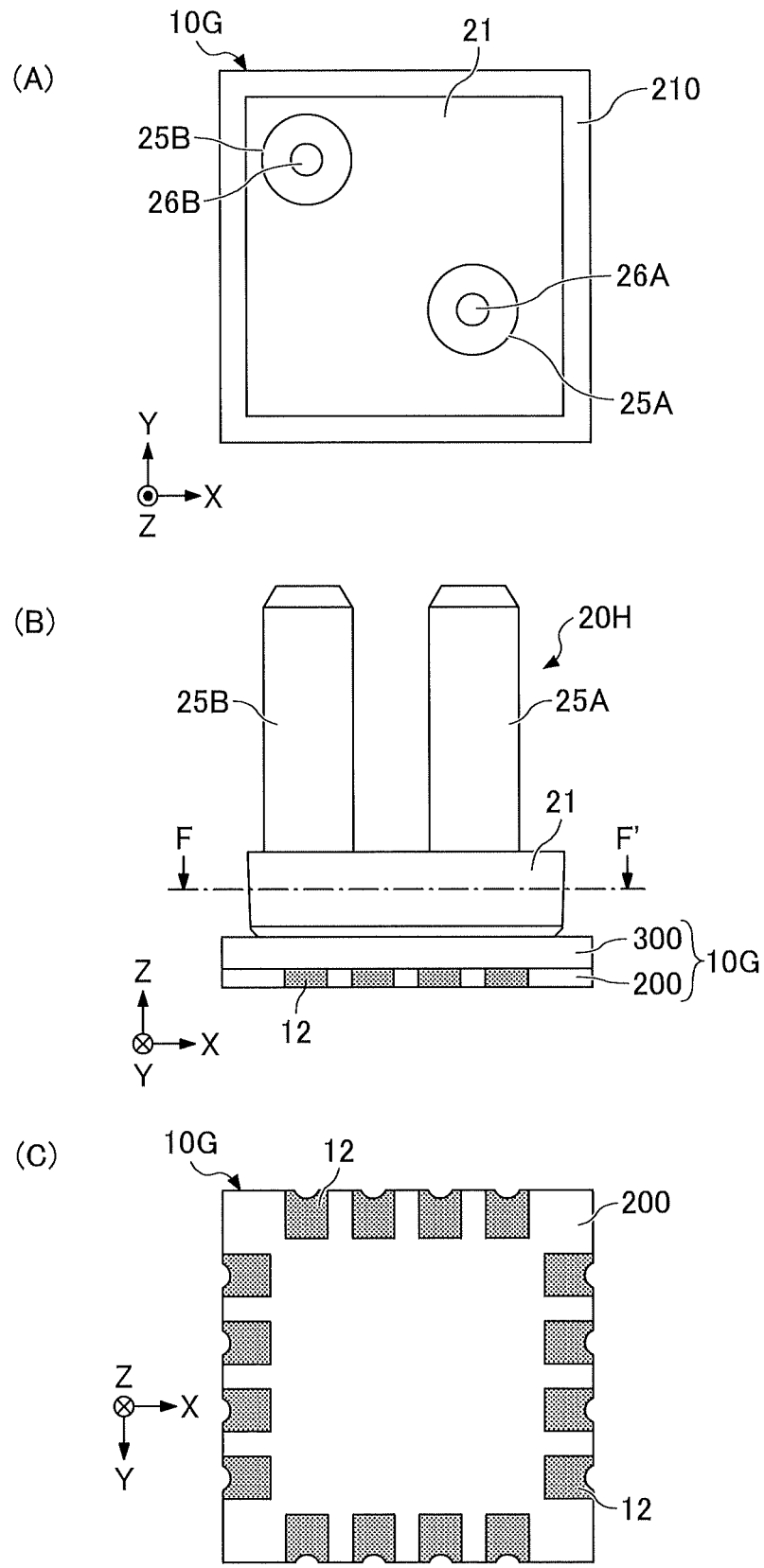
FIG. 25 is a top plan view (A), a side view (B), and a bottom plan view (C) of a pressure sensor device according to a second variation of the third embodiment.
Figure 26:
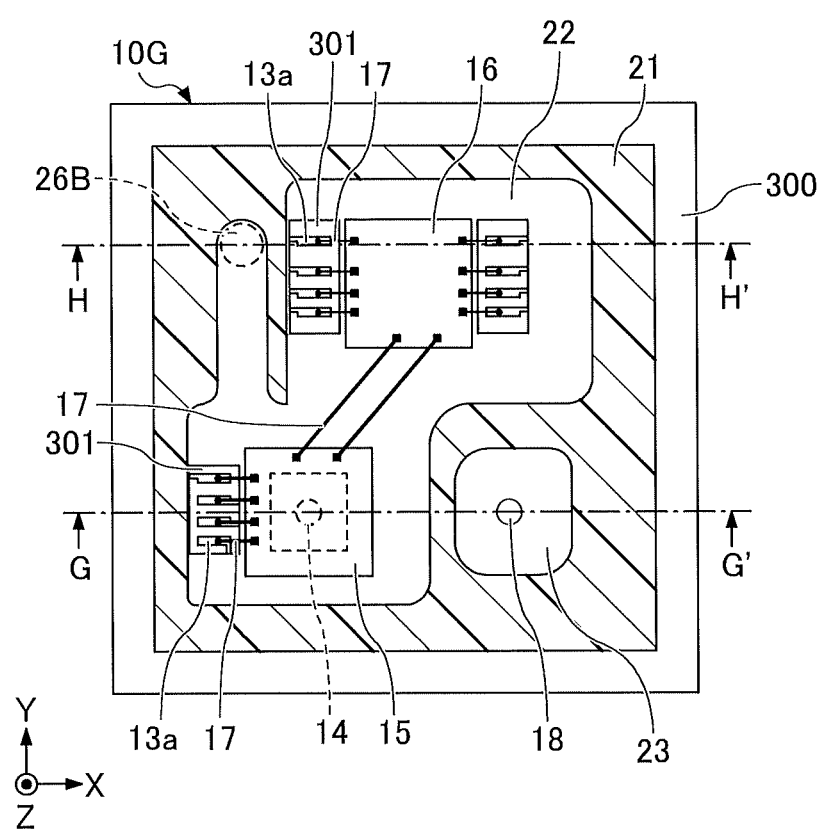
FIG. 26 is a cross-sectional view taken along line F-F' in FIG. 25(B)

FIG. 25(A) is a top plan view, FIG. 25(B) is a side view, and FIG. 25(C) is a bottom plan view of a pressure sensor device according to a second variation of the third embodiment. FIG. 26 is a cross-sectional view of the pressure sensor device according to the second variation of the third embodiment, and corresponds to a cross section taken along line F-F' in FIG. 25(B).

A cover 20H is mounted on the upper surface of the board 10G. The cover 20H includes a box-shaped part 21, a first tubular part 25A, and a second tubular part 25B. The board 10G has the same configuration as the board 10G of the third embodiment.

The first tubular part 25A is a tubular structure having a columnar outer shape, and a tubular-part upper-end opening 26A is provided at an end of the tubular structure as a second pressure inlet. The second tubular part 25B is a tubular structure having a columnar outer shape, and a tubular-part upper-end opening 26B is provided at an end of the tubular structure as a first pressure inlet. The first tubular part 25A is provided on a portion of the box-shaped part 21 above the second recess 23.

Figure 27:
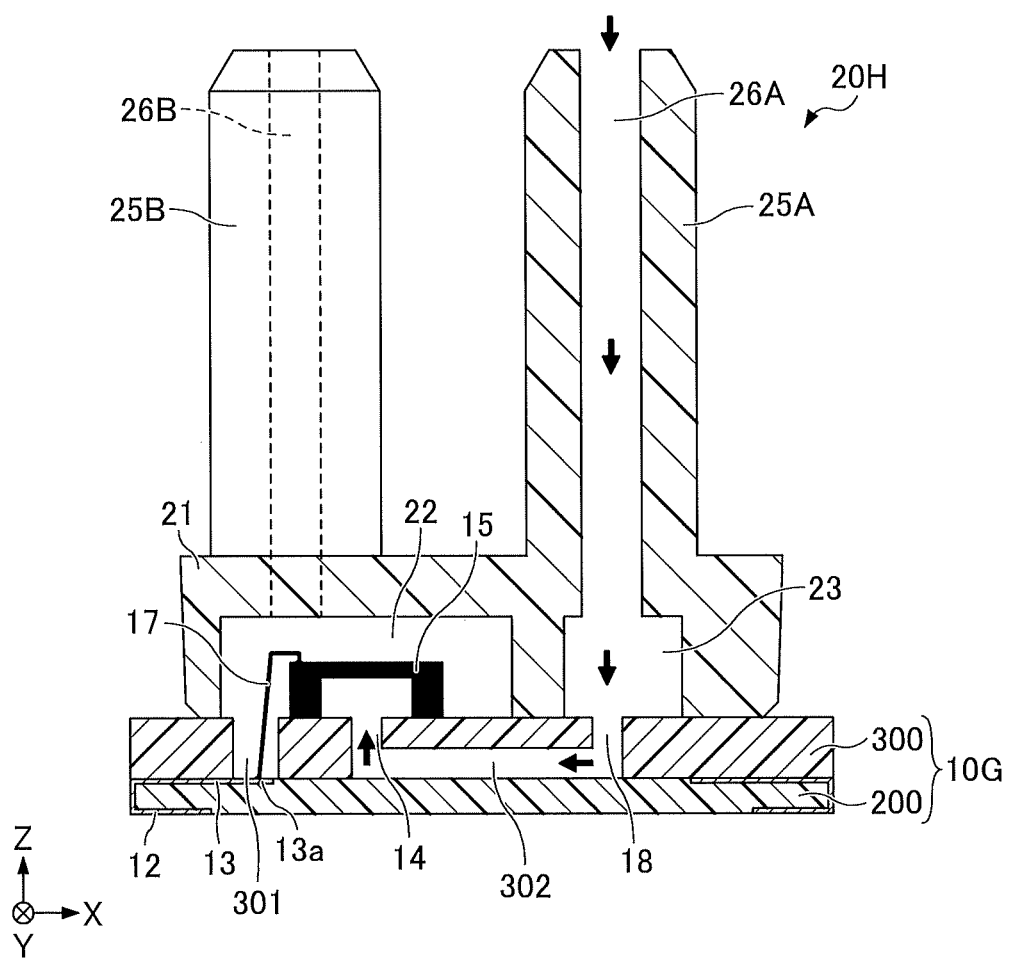
FIG. 27 is a cross-sectional view taken along line G-G' in FIG. 26.
Figure 28:
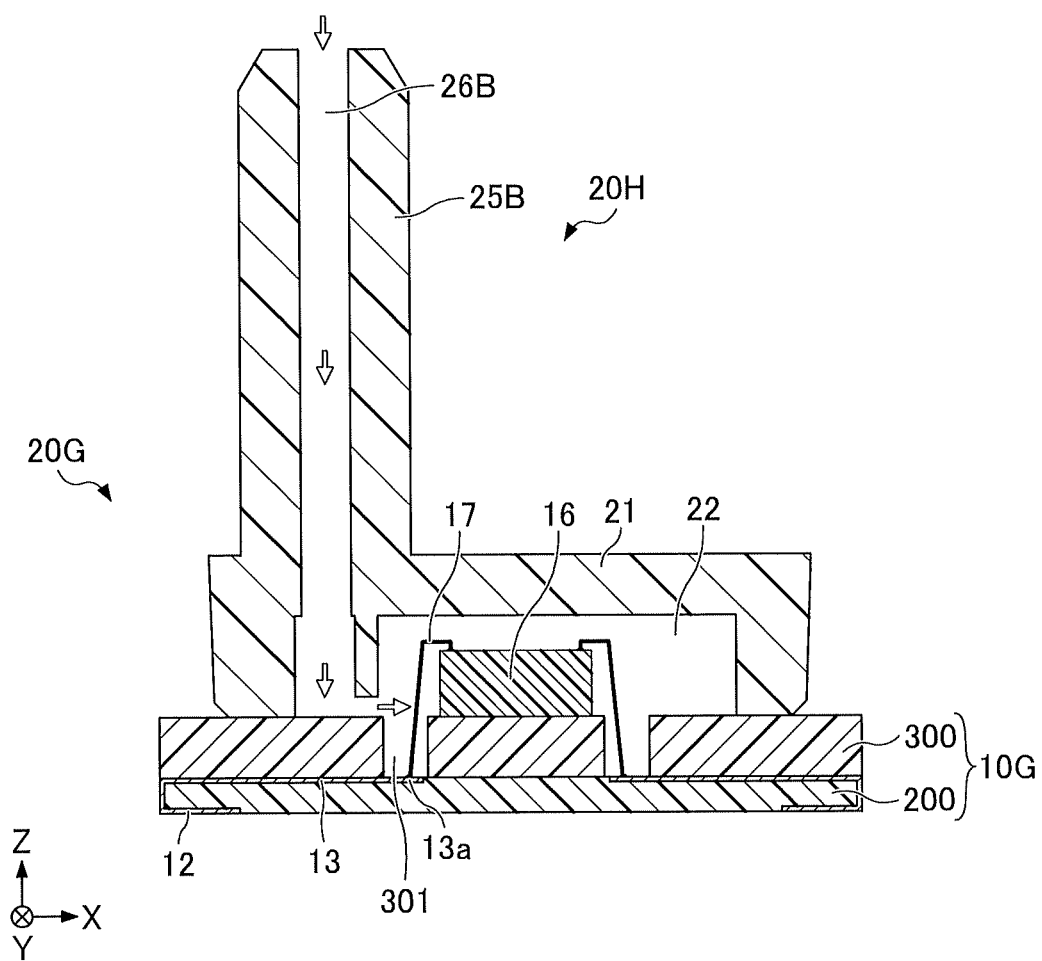
FIG. 28 is a cross-sectional view taken along line H-H' in FIG. 26.

FIGS. 27 and 28 are cross-sectional views of the pressure sensor device according to this variation. FIG. 27 corresponds to a cross section taken along G-G' FIG. 26. FIG. 28 corresponds to a cross section taken along line H-H' in FIG. 26. Similarly to the third embodiment, in the present embodiment, the first recess 22 and the second recess 23 are formed in a surface of the box-shaped part 21 to be bonded to the board 10G.

As illustrated in FIG. 27, similarly to the third embodiment, the tubular-part upper-end opening 26A communicates with the lower surface of the diaphragm structure of the pressure sensor element 15 via the second hollow part and the third hollow part and forms a second channel.

In this variation, instead of the box-shaped-part opening 27 in the third embodiment, the second tubular part 25B is provided on a portion of the box-shaped part 21 above the first recess 22. As illustrated in FIG. 28, the tubular-part upper-end opening 26B communicates with the upper surface of the diaphragm structure of the pressure sensor element 15 in the first hollow part and forms a first channel.

In the pressure sensor device of this variation, fluids other than air are introduced from the first tubular part 25A and the second tubular part 25B to the pressure sensor element 15, and the pressure difference between the two fluids can be obtained as information.

The board 10G can be modified similarly to the third embodiment.

The first tubular part 25A of this variation corresponds to a second tubular part recited in the claims, and the second tubular part 25B corresponds to a first tubular part recited in the claims.

Third Variation

Figure 29:
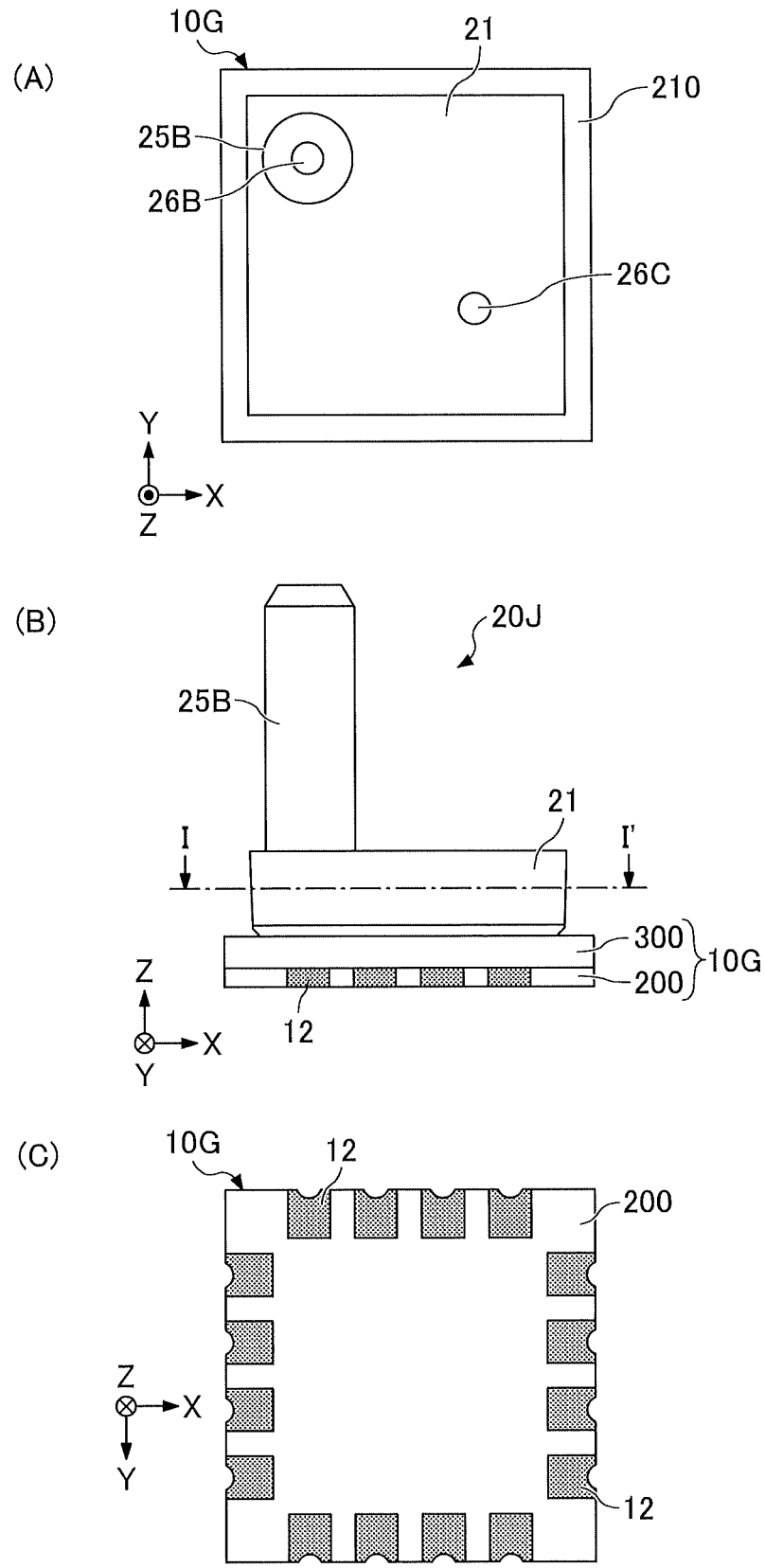
FIG. 29 is a top plan view (A), a side view (B), and a bottom plan view (C) of a pressure sensor device according to a third variation of the third embodiment.
Figure 30:
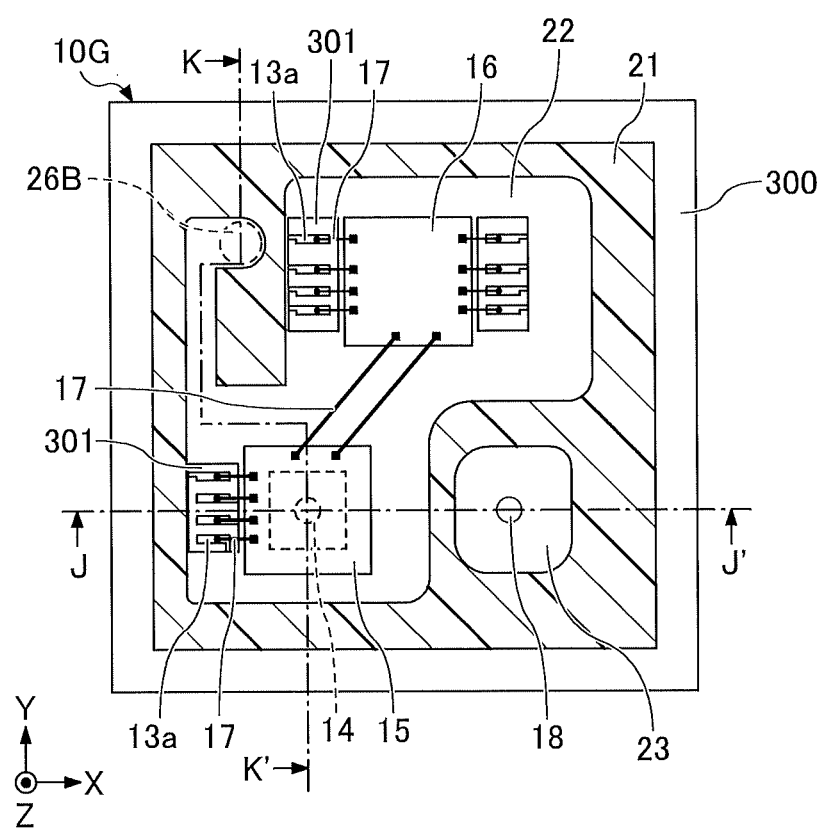
FIG. 30 is a cross-sectional view taken along line I-I' in FIG. 29(B)

FIG. 29(A) is a top plan view, FIG. 29(B) is a side view, and FIG. 29(C) is a bottom plan view of a pressure sensor device according to a third variation of the third embodiment. FIG. 30 is a cross-sectional view of the pressure sensor device according to the third variation of the third embodiment and corresponds to a cross section taken along line I-I' in FIG. 29(B).

A cover 20J is mounted on the upper surface of the board 10G. The cover 20J includes a box-shaped part 21 and a second tubular part 25B. The cover 20J of this variation is different from the cover 20H of the second variation in that the cover 20J does not include the first tubular part 25A. In this variation, as illustrated in FIG. 29(A), an opening 26C is formed in the upper surface of the box-shaped part 21 as a pressure inlet that communicates with the second recess 23. The board 10G has the same configuration as the board 10G according to the third embodiment.

Figure 31:
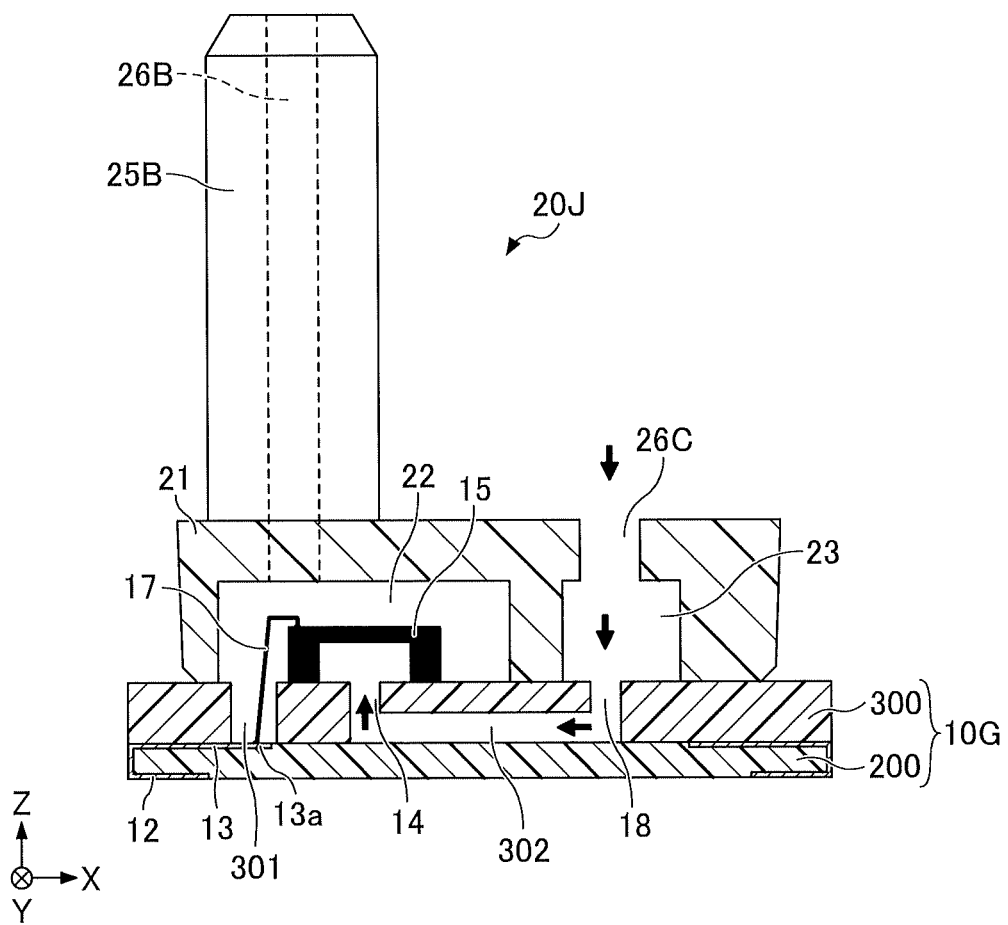
FIG. 31 is a cross-sectional view taken along line J-J' in FIG. 30.
Figure 32:
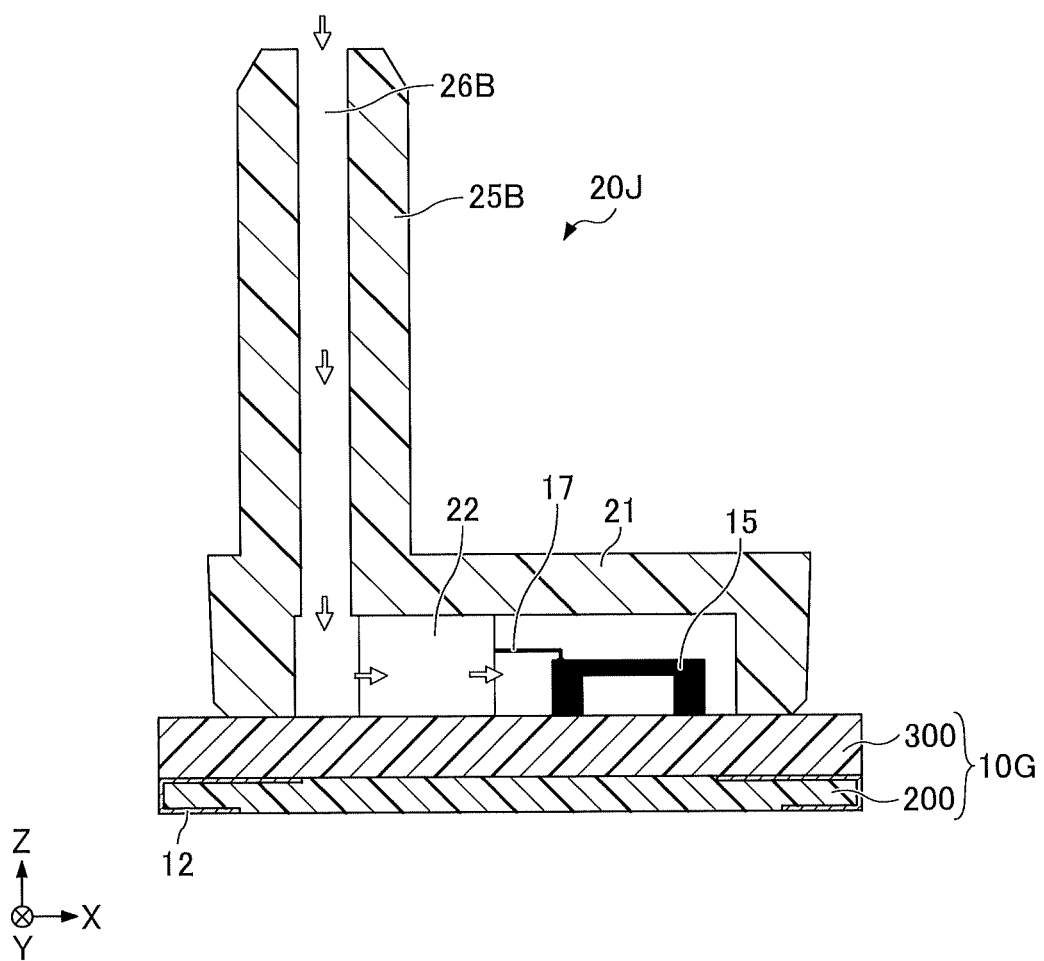
FIG. 32 is a cross-sectional view taken along line K-K' in FIG. 30.

FIGS. 31 and 32 are cross-sectional views of the pressure sensor device according to this variation. FIG. 31 corresponds to a cross section taken along line J-J' in FIG. 30. FIG. 32 corresponds to a cross section taken along line K-K' in FIG. 30. In this variation, similarly to the second variation, the first recess 22 and the second recess 23 are formed in a surface of the box-shaped part 21 to be bonded to the board 10G.

As illustrated in FIG. 31, the opening 26C communicates with the lower surface of the diaphragm structure of the pressure sensor element 15 via the second hollow part and the third hollow part and forms a second channel. Also, as illustrated in FIG. 32, the tubular-part upper-end opening 26B communicates with the upper surface of the diaphragm structure of the pressure sensor element 15 in the first hollow part and forms a first channel.

In the pressure sensor device according to this variation, fluids other than air are guided to the pressure sensor element 15 from the opening 26C and the second tubular part 25B, and the pressure difference between the two fluids can be obtained as information.

Fourth Variation

Figure 33:
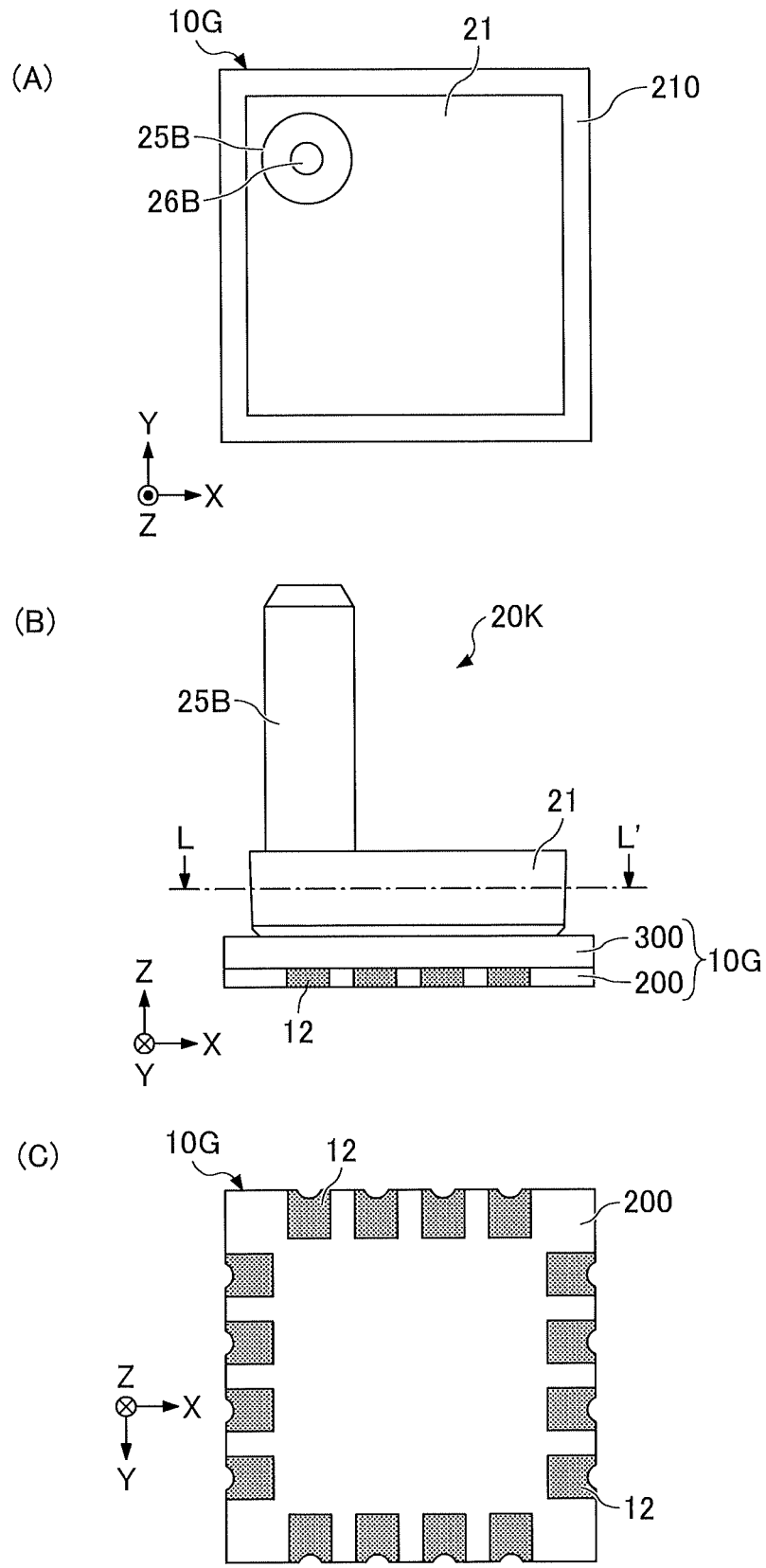
FIG. 33 is a top plan view (A), a side view (B), and a bottom plan view (C) of a pressure sensor device according to a fourth variation of the third embodiment.
Figure 34:
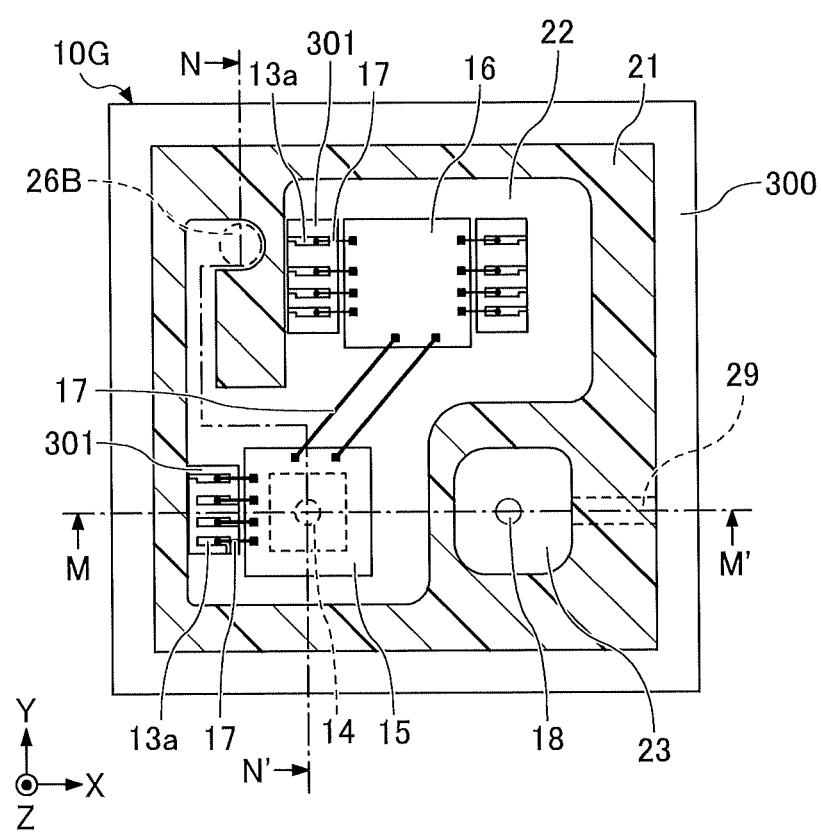
FIG. 34 is a cross-sectional view taken along line L-L' in FIG. 33(B)

FIG. 33(A) is a top plan view, FIG. 33(B) is a side view, and FIG. 33(C) is a bottom plan view of a pressure sensor device according to a fourth variation of the third embodiment. FIG. 34 is a cross-sectional view of the pressure sensor device according to the fourth variation of the third embodiment, and corresponds to a cross section taken along line L-L' in FIG. 33(B).

A cover 20K is mounted on the upper surface of the board 10G. The cover 20K includes a box-shaped part 21 and a second tubular part 25B. The cover 20K of this variation differs from the cover 20J of the third variation in the position where an opening is formed as a pressure inlet that communicates with the second recess 23. In this variation, as illustrated in FIG. 33(A), the opening 26C described in the third variation is not formed in the upper surface of the box-shaped part 21.

Figure 35:
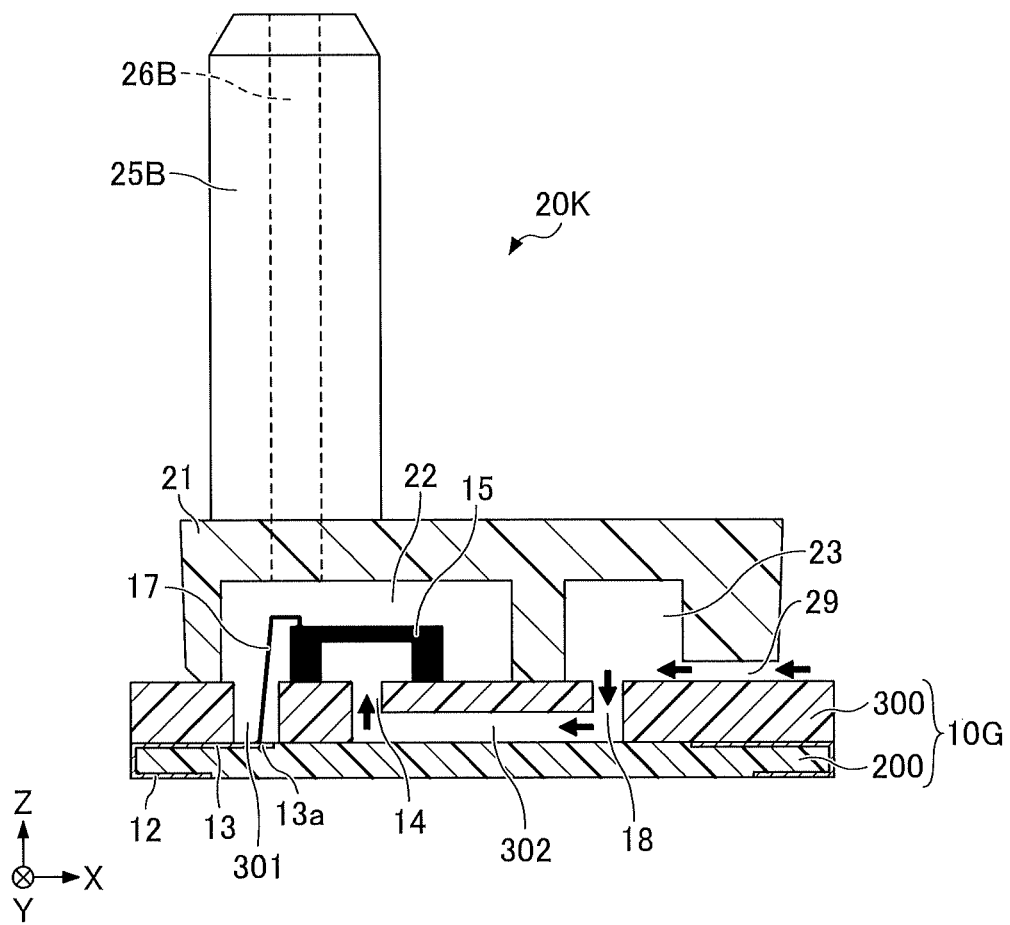
FIG. 35 is a cross-sectional view taken along line M-M' in FIG. 34.
Figure 36:
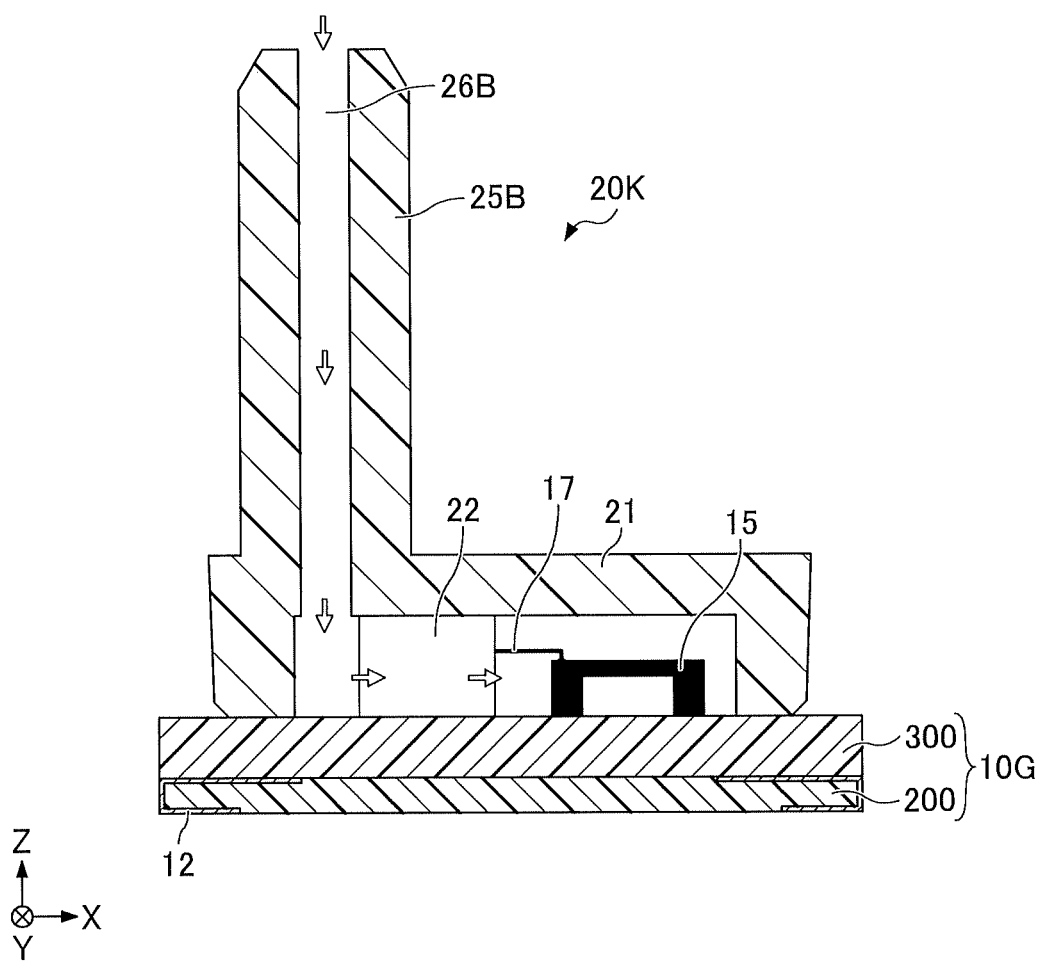
FIG. 36 is a cross-sectional view taken along line N-N' in FIG. 34.

FIGS. 35 and 36 are cross-sectional views of the pressure sensor device according to this variation. FIG. 35 corresponds to a cross section taken along line M-M' in FIG. 34. FIG. 36 corresponds to a cross section taken along line N-N' in FIG. 30. In this variation, similarly to the third variation, the first recess 22 and the second recess 23 are formed in a surface of the box-shaped part 21 to be bonded to the board 10G.

As illustrated in FIG. 35, in this variation, an opening 29 is formed in a side surface of the box-shaped part 21 as a pressure inlet that communicates with the second recess 23. Also, in this variation, the opening 29 is located between the box-shaped part 21 and the second board 300 and is shaped like a groove. The opening 29 communicates with the lower surface of the diaphragm structure of the pressure sensor element 15 via the second hollow part and the third hollow part and forms a second channel. Also, as illustrated in FIG. 36, the tubular-part upper-end opening 26B communicates with the upper surface of the diaphragm structure of the pressure sensor element 15 in the first hollow part and forms a first channel.

In the pressure sensor device according to this variation, fluids other than air are guided to the pressure sensor element 15 from the opening 29 and the second tubular part 25B, and the pressure difference between the two fluids cart be obtained as information.

Preferred embodiments of the present invention are described above. However, the present invention is not limited to the specifically disclosed embodiments, and variations and modifications may be made without departing from the scope of the present invention. For example, the through hole of the substrate does not necessarily have a circular shape, and may have a different shape such as a square shape.

The present application claims priority to Japanese Patent Application No. 2018-024647 filed on Feb. 15, 2018, the entire contents of which are hereby incorporated herein by reference.

EXPLANATION OF REFERENCE NUMERALS 10A, 10B, 10C, 10G board
11, 210, 310 substrate
12 terminal
13 wire
14 through hole
15 pressure sensor element
16 control chip
17 wire bonding
18 second through hole
20A, 20B, 20C, 20D, 20E, 20G, 20H, 20J, 20K cover
21 box-shaped part
21a box-shaped-part through hole
22 first recess
23 second recess
24 communicating part
25, 25E tubular part
25A, 25C first tubular part
25B, 25D second tubular part
26 tubular-part opening
26A, 26B, 26t tubular-part upper-end opening
27 box-shaped-part opening
28, 26C, 29 opening
30 lid
31 side wall
31a, 31e metal layer
31b, 31d resist layer
31c bonding sheet
32 lid opening
100 motherboard
100A opening
200 first board
201 opening
202 recess
203 frame
211, 212, 311 resist layer
220 protrusion
300 second board
301 land opening
302 recess
303, 304 frame
400 bonding sheet

The invention claimed is:

1. A pressure sensor device, comprising:
a first board including external connection terminals;
a second board stacked on an upper surface of the first board and including a first through hole and a second through hole formed therein;
a pressure sensor element including a diaphragm structure and mounted on an upper surface of the second board such that the first through hole is closed by the diaphragm structure; and
a cover that is mounted on the upper surface of the second board to cover the pressure sensor element and in which a first channel for guiding a first fluid to an upper surface of the diaphragm structure is formed,
wherein a second channel is formed between the first board and the second board, the second channel leading from the second through hole to the first through hole and guiding a second fluid to a lower surface of the diaphragm structure.

2. The pressure sensor device as claimed in claim 1, wherein
the cover includes a box-shaped part that forms a first hollow part and a second hollow part between the cover and the second board and a first tubular part that is formed on an upper surface of the second hollow part;
the pressure sensor element is disposed in the first hollow part, and the second hollow part communicates with the second through hole;
the first channel leads from a first pressure inlet provided at an upper corner of the first hollow part to the first hollow part and guides the first fluid to the upper surface of the diaphragm structure; and
the second channel leads from a second pressure inlet provided at an upper end of the first tubular part to the second hollow part and guides the second fluid to the lower surface of the diaphragm structure.

3. The pressure sensor device as claimed in claim 1, wherein
the cover includes
a box-shaped part that forms a first hollow part and a second hollow part between the cover and the second board,
a first tubular part formed on an upper surface of the first hollow part, and
a second tubular part formed on an upper surface of the second hollow part;
the pressure sensor element is disposed in the first hollow part, and the second hollow part communicates with the second through hole;
the first channel leads from a first pressure inlet provided at an upper end of the first tubular part to the first hollow part and guides the first fluid to the upper surface of the diaphragm structure; and
the second channel leads from a second pressure inlet provided at an upper end of the second tubular part to the second hollow part and guides the second fluid to the lower surface of the diaphragm structure.

4. The pressure sensor device as claimed in claim 1, wherein
the first board includes a first recess in the upper surface there of;
the second board includes a second recess in a lower surface thereof; and
the first recess and the second recess face each other and form a third hollow part that constitutes the second channel.

5. The pressure sensor device as claimed in claim 1, wherein
the cover includes
a box-shaped part that forms a first hollow part and a second hollow part between the cover and the second board,
a tubular part formed on an upper surface of the first hollow part, and
an opening formed in an upper surface or a side surface of the second hollow part;
the pressure sensor element is disposed in the first hollow part, and the second hollow part communicates with the second through hole;
the first channel leads from a first pressure inlet provided at an upper end of the tubular part to the first hollow part and guides the first fluid to the upper surface of the diaphragm structure; and
the second channel leads from the opening provided as a second pressure inlet to the second hollow part and guides the second fluid to the lower surface of the diaphragm structure.

6. The pressure sensor device as claimed in claim 5, wherein the opening is located between the box-shaped part and the second board.

7. A pressure sensor device, comprising:
a board including external connection terminals and a through hole formed thereon;
a pressure sensor element including a diaphragm structure and mounted on an upper surface of the board such that the through hole is closed by the diaphragm structure;
a cover that is mounted on the upper surface of the board to cover the pressure sensor element and in which a first channel for guiding a first fluid to an upper surface of the diaphragm structure is formed;
a side wall disposed to protrude downward from a lower surface of the board; and
a lid disposed on a lower end of the side wall to cover at least the through hole and form a second channel for guiding a second fluid to a lower surface of the diaphragm structure via the through hole, wherein
a second pressure inlet that is open in a horizontal direction is formed in a part of the side wall; and
the second channel leads from the second pressure inlet via a space between the lid and the board to the through hole.

8. The pressure sensor device as claimed in claim 7, wherein
the cover includes a box-shaped part forming a hollow part between the cover and the board and a tubular part formed on an upper surface of the box-shaped part; and
the first channel is formed to lead from a first pressure inlet provided at an upper end of the tubular part, pass through the tubular part and the upper surface of the box-shaped part, and reach the hollow part.

9. The pressure sensor device as claimed in claim 7, wherein
the board has a rectangular shape in plan view;
the external connection terminals are formed along two opposite sides of the rectangular shape; and
the second pressure inlet is open toward a side different from the two opposite sides.

10. A pressure sensor device, comprising:
a board including external connection terminals and a through hole formed thereon;
a pressure sensor element including a diaphragm structure and mounted on an upper surface of the board such that the through hole is closed by the diaphragm structure;
a cover that is mounted on the upper surface of the board to cover the pressure sensor element and in which a first channel for guiding a first fluid to an upper surface of the diaphragm structure is formed; and
a lid disposed on a lower surface of the board via a side wall to cover at least the through hole and form a second channel for guiding a second fluid to a lower surface of the diaphragm structure via the through hole, wherein
a second through hole is formed in the board;
the cover includes a box-shaped part that forms a first hollow part and a second hollow part between the cover and the board and a tubular part formed on an upper surface of the box-shaped part;
the second channel is formed to lead from a second pressure inlet provided at an upper end of the tubular part, pass through the tubular part and the upper surface of the box-shaped part to reach the second hollow part, and further extend via the second through hole and a space between the lid and the board to the through hole;

a first pressure inlet is formed at least in an upper surface, a side surface, or an upper corner of the first hollow part of the box-shaped part at a position lower than the second pressure inlet; and the first channel is formed to lead from the first pressure inlet to the first hollow part.

11. The pressure sensor device as claimed in claim 10, wherein the board has a rectangular shape in plan view;

the external connection terminals are formed along two opposite sides of the rectangular shape; and the first pressure inlet is open in a side different from the two opposite sides.

* * * * *